(12) United States Patent
Muruganathan et al.

(10) Patent No.: US 10,893,490 B2
(45) Date of Patent: Jan. 12, 2021

(54) CONFIGURABLE CODEBOOK FOR ADVANCED CSI FEEDBACK OVERHEAD REDUCTION

(71) Applicant: Telefonaktiebolaget LM Ericsson (publ), Stockholm (SE)

(72) Inventors: Siva Muruganathan, Stittsville (CA); Sebastian Faxér, Järfälla (SE); Shiwei Gao, Nepean (CA); Stephen Grant, Pleasanton, CA (US); Robert Mark Harrison, Grapevine, TX (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/759,063

(22) PCT Filed: Aug. 11, 2017

(86) PCT No.: PCT/IB2017/054913
§ 371 (c)(1),
(2) Date: Mar. 9, 2018

(87) PCT Pub. No.: WO2018/029647
PCT Pub. Date: Feb. 15, 2018

(65) Prior Publication Data
US 2019/0045460 A1 Feb. 7, 2019

Related U.S. Application Data

(60) Provisional application No. 62/374,655, filed on Aug. 12, 2016.

(51) Int. Cl.
*H04W 52/36* (2009.01)
*H04B 7/06* (2006.01)
*H04B 7/0456* (2017.01)

(52) U.S. Cl.
CPC ........ *H04W 52/367* (2013.01); *H04B 7/0482* (2013.01); *H04B 7/0617* (2013.01)

(58) Field of Classification Search
CPC ................. H04B 7/0456–0626; H04W 52/367
See application file for complete search history.

(56) References Cited

U.S. PATENT DOCUMENTS 9,331,767 B1  5/2016  Thomas et al.
2002/0187814 A1  12/2002  Yoshida
(Continued)

FOREIGN PATENT DOCUMENTS

CN  104025657 A  9/2014
EP  1 423 926 A1  6/2004
(Continued)

OTHER PUBLICATIONS

Notification of Transmittal of the International Preliminary Report on Patentability dated Nov. 22, 2018 issued in related PCT Application No. PCT/IB2017/054911 consisting of 24 pages.
(Continued)

*Primary Examiner* — Raymond S Dean
(74) *Attorney, Agent, or Firm* — Christopher & Weisberg, P.A.

(57) ABSTRACT

Network nodes, wireless devices and methods of reducing signaling overhead are provided. In one embodiment, a method includes transmitting to the wireless device at least one power threshold parameter to be used by the wireless device to determine a number of beams to be included in a multi-beam precoder codebook and transmitting to the wireless device a signal to interference plus noise ratio (SINR) to be used by the wireless device to determine to use one of a single beam precoder and a multiple beam precoder.

12 Claims, 14 Drawing Sheets

(56) References Cited

U.S. PATENT DOCUMENTS

| | | | |
|---|---|---|---|
| 2010/0046667 A1* | 2/2010 | Tsutsui | H01Q 1/246 |
| | | | 375/296 |
| 2011/0026418 A1 | 2/2011 | Bollea et al. | |
| 2011/0050489 A1 | 3/2011 | Maenpa et al. | |
| 2011/0069773 A1 | 3/2011 | Doron et al. | |
| 2011/0305263 A1* | 12/2011 | Jöngren | H04B 7/0617 |
| | | | 375/219 |
| 2012/0033566 A1 | 2/2012 | Pora et al. | |
| 2013/0064129 A1 | 3/2013 | Koivisto et al. | |
| 2013/0107915 A1 | 5/2013 | Benjebbour et al. | |
| 2013/0163457 A1 | 6/2013 | Kim et al. | |
| 2013/0182787 A1 | 7/2013 | Kakishima et al. | |
| 2013/0201912 A1 | 8/2013 | Sheng et al. | |
| 2013/0308715 A1 | 11/2013 | Nam et al. | |
| 2013/0343215 A1 | 12/2013 | Li et al. | |
| 2014/0003240 A1* | 1/2014 | Chen | H04W 28/08 |
| | | | 370/235 |
| 2014/0037029 A1 | 2/2014 | Murakami et al. | |
| 2014/0301492 A1 | 10/2014 | Xin et al. | |
| 2014/0334564 A1* | 11/2014 | Singh | H04B 7/0413 |
| | | | 375/267 |
| 2015/0049702 A1 | 2/2015 | Cheng et al. | |
| 2015/0078191 A1 | 3/2015 | Jongren et al. | |
| 2015/0207547 A1 | 7/2015 | Ko et al. | |
| 2015/0222340 A1 | 8/2015 | Nagata et al. | |
| 2015/0381253 A1 | 12/2015 | Kim et al. | |
| 2016/0013838 A1 | 1/2016 | Zhu et al. | |
| 2016/0072562 A1 | 3/2016 | Onggosanusi et al. | |
| 2016/0127021 A1 | 5/2016 | Noh et al. | |
| 2016/0142117 A1 | 5/2016 | Rahman et al. | |
| 2016/0156401 A1 | 6/2016 | Onggosanusi et al. | |
| 2016/0173180 A1 | 6/2016 | Cheng et al. | |
| 2016/0192383 A1 | 6/2016 | Hwang et al. | |
| 2016/0323022 A1 | 11/2016 | Rahman et al. | |
| 2016/0352012 A1* | 12/2016 | Foo | H01Q 3/40 |
| 2017/0134080 A1 | 5/2017 | Rahman et al. | |
| 2017/0134082 A1 | 5/2017 | Onggosanusi et al. | |
| 2017/0238323 A1 | 8/2017 | Marinier et al. | |
| 2017/0311187 A1* | 10/2017 | Dong | H04B 7/024 |
| 2018/0034519 A1* | 2/2018 | Rahman | H04B 7/0456 |
| 2018/0131420 A1 | 5/2018 | Faxer et al. | |
| 2018/0191411 A1 | 7/2018 | Faxer et al. | |
| 2018/0219605 A1 | 8/2018 | Davydov et al. | |
| 2019/0036584 A1 | 1/2019 | Chang et al. | |
| 2019/0053220 A1 | 2/2019 | Zhang et al. | |
| 2014/0226611 A1 | 10/2020 | Kang et al. | |

FOREIGN PATENT DOCUMENTS

| | | |
|---|---|---|
| JP | 2014-053811 A | 3/2014 |
| KR | 10-2016-0029503 A | 3/2016 |
| WO | 2015060548 A1 | 4/2015 |
| WO | 2015/147814 A1 | 10/2015 |
| WO | 2015/190866 A1 | 12/2015 |
| WO | 2016/048223 A1 | 3/2016 |
| WO | 2016/080742 A1 | 5/2016 |
| WO | 2016/120443 A1 | 8/2016 |
| WO | 2017/168349 A1 | 10/2017 |

OTHER PUBLICATIONS

Notification of Transmittal of the International Preliminary Report on Patentability dated Nov. 7, 2018 issued in related PCT Application No. PCT/IB2017/054912 consisting of 46 pages.

Notification of Transmittal of the International Preliminary Report on Patentability dated Nov. 20, 2018 issued in corresponding PCT Application No. PCT/IB2017/054913 consisting of 46 pages.

LTE; Evolved Universal Terrestrial Radio Access (E-UTRA); Physical Layer Procedures, 3GPP TS 36.213 Version 13.2.0 Release 13 (Aug. 2016), consisting of 383 pages.

Written Opinion of the International Preliminary Examining Authority dated Jul. 11, 2018 issued in corresponding PCT Application No. PCT/IB2017/054913 consisting of 6 pages.

Office Action dated Mar. 18, 2019 issued in U.S. Appl. No. 15/759,400, consisting of 42 pages.

3GPP TS 36.211 V13.0.0 3rd Generation Partnership Project; Technical Specification Group Radio Access Network; Evolved Universal Terrestrial Radio Access (E-UTRA); Physical Channels and Modulation (Release 13) (Dec. 2015) consisting of 141 pages.

3GPP TS 36.212 V8.8.0 3rd Generation Partnership Project; Technical Specification Group Radio Access Network; Evolved Universal Terrestrial Radio Access (E-UTRA); Multiplexing and Channel Coding (Release 8) (Dec. 2009), consisting of 60 pages.

3GPP TS 36.212 V13.0.0 3rd Generation Partnership Project; Technical Specification Group Radio Access Network; Evolved Universal Terrestrial Radio Access (E-UTRA); Multiplexing and Channel Coding (Release 13) (Dec. 2015), consisting of 121 pages.

3GPP TS 36.212 V13.2.0 3rd Generation Partnership Project; Technical Specification Group Radio Access Network; Evolved Universal Terrestrial Radio Access (E-UTRA); Multiplexing and Channel Coding (Release 13) (Jun. 2016), consisting of 140 pages.

3GPP TS 36.213 V13.0.1 3rd Generation Partnership Project; Technical Specification Group Radio Access Network; Evolved Universal Terrestrial Radio Access (E-UTRA); Physical Layer Procedures (Release 13) (Jan. 2016), consisting of 326 pages.

3GPP TS 36.214 V13.2.0 3rd Generation Partnership Project; Technical Specification Group Radio Access Network; Evolved Universal Terrestrial Radio Access (E-UTRA); Physical Layer; Measurements (Release 13) (Jun. 2016), consisting of 19 pages.

3GPP TS 36.321 V13.0.0 3rd Generation Partnership Project; Technical Specification Group Radio Access Network; Evolved Universal Terrestrial Radio Access (E-UTRA); Medium Access Control (MAC) Protocol Specification (Release 13) (Dec. 2015), consisting of 82 pages.

3GPP TS 36.321 V13.2.0 3rd Generation Partnership Project; Technical Specification Group Radio Access Network; Evolved Universal Terrestrial Radio Access (E-UTRA); Medium Access Control (MAC) Protocol Specification (Release 13) (Jun. 2016), consisting of 91 pages.

3GPP TS 36.331 V13.1.0 3rd Generation Partnership Project; Technical Specification Group Radio Access Network; Evolved Universal Terrestrial Radio Access (E-UTRA); Radio Resource Control (RRC); Protocol Specification (Release 13) (Mar. 2016), consisting of 551 pages.

3GPP TS 36.331 V13.0.0 3rd Generation Partnership Project; Technical Specification Group Radio Access Network; Evolved Universal Terrestrial Radio Access (E-UTRA); Radio Resource Control (RRC); Protocol Specification (Release 13) (Dec. 2015), consisting of 507 pages.

Rahman et al., "Linear Combination Codebook Based CSI Feedback Scheme for FD-MIMO Systems" IEEE 2015, consisting of 6 pages.

3GPP TSG-RAN WG1 #82, R1-154557, Source: Ericsson; Beijing, China, Aug. 24-28, 2015; FD-MIMO Codebook Structure, Design Features, and Dimensioning; Agenda Item: 7.25.3.1, Document for Discussion and Decision, consisting of 8 pages.

3GPP TSG RAN WG1 Meeting #85, R1-164777; Source: Samsung; Nanjing, China, May 23-27, 2016; Hybrid PMI Codebook Based CSI Reporting and Simulation Results; Agenda Item: 6.2.3.2.2, Document for Discussion and Decision, consisting of 8 pages.

3GPP TSG-RAN WG1 #85, R1-165100; Source: Ericsson, Nanjing, China, May 23-27, 2016; "High Resolution CSI Feedback"; Agenda Item: 6.2.3.2.3, Document for Discussion and Decision, consisting of 8 pages.

3GPP TSG RAN Meeting #71, RP-160623; Source: Samsung, Goteborg, Sweden, Mar. 7-10, 2016; "New WID Proposal: Enhancements on Full-Dimension (FD) MIMO for LTE", Agenda Item: 10.1.1, Document for: Approval, consisting of 8 pages.

Invitation to Pay Additional Fees and, Where Applicable, Protest Fee dated Feb. 16, 2018 issued in correspondint PCT Application Serial No. PCT/IB2017/054910, consisting of 14 pages.

International Search Report and Written Opinion of the International Searching Authority dated Nov. 30, 2017 issued in corresponding PCT Application Serial No. PCT/IB2017/054913, consisting of 9 pages.

(56) References Cited

OTHER PUBLICATIONS

Invitation to Pay Additional Fees and, Where Applicable, Protest Fee dated Nov. 17, 2017 issued in corresponding PCT Application Serial No. PCT/IB2017/054911, consisting of 13 pages.
International Search Report and Written Opinion of the International Searching Authority dated Feb. 12, 2018 issued in corresponding PCT Application Serial No. PCT/IB2017/054911, consisting of 24 pages.
International Search Report and Written Opinion of the International Searching Authority dated Nov. 27, 2017 ssued in corresponding PCT Application Serial No. PCT/IB2017/054912, consisting of 9 pages.
Non-Final Office Action dated May 16, 2019 issued in U.S. Appl. No. 15/758,604, consisting of 27 pages.
Non-Final Office Action dated Jun. 24, 2019 issued in U.S. Appl. No. 15/757,165, consisting of 37 pages.
Final Office Action dated Dec. 16, 2019 issued in U.S. Appl. No. 15/757,165, consisting of 14 pages.
Final Office Action dated Nov. 27, 2019 issued in U.S. Appl. No. 15/758,604, consisting of 14 pages.
Non-Final Office Action dated Jan. 31, 2020 issued in U.S. Appl. No. 16/594,555, consisting of 21 pages.
Japanese Office Action and English translation thereof dated Mar. 30, 2020 and issued in corresponding Japanese Application No. 2019-507184, consisting of 8 pages.
Ericsson 3GPP TSG-RAN WG1 #85; R1-165100; High Resolution CSI Feedback; Agenda Item: 6.2.3.2.3; Document for Discussion and Decision; Nanjing, China May 23-27, 2016.
Non-Final Office Action dated Jul. 6, 2020 issued in U.S. Appl. No. 15/758,604, consisting of 8 pages.
Indian Examination Report dated Aug. 18, 2020 issued in Indian Patent Application No. 201937004361, consisting of 6 pages.
European Examination Report dated Aug. 14, 2020 issued in European Patent Application No. 17 767 929.7, consisting of 8 pages.
Final Office Action dated Oct. 22, 2020, issued in U.S. Appl. No. 15/757,165 consisting of 18 pages.
Indian Examination Report dated Oct. 13, 2020 issued in Indian Patent Application No. 201937005164, consisting of 7 pages.

\* cited by examiner

PRECODER ELEMENTS TO ANTENNA PORT MAPPING EXAMPLE: (N1,N2)=(4,2)

CONFIGURABLE CODEBOOK FOR ADVANCED CSI FEEDBACK OVERHEAD REDUCTION

CROSS-REFERENCE TO RELATED APPLICATIONS

This application is a Submission Under 35 U.S.C. § 371 for U.S. National Stage Patent Application of International Application Number: PCT/IB2017/054913, filed Aug. 11, 2017 entitled "CONFIGURABLE CODEBOOK FOR ADVANCED CSI FEEDBACK OVERHEAD REDUCTION," which claims priority to U.S. Provisional Application No. 62/374,655, filed Aug. 12, 2016, entitled "CONFIGURABLE CODEBOOK FOR ADVANCED CSI FEEDBACK OVERHEAD REDUCTION" the entirety of both of which are incorporated herein by reference.

TECHNICAL FIELD

The present disclosure relates to wireless communications, and in particular, configurable codebooks for advanced channel state information, CIS, feedback overhead reduction.

BACKGROUND

LTE uses orthogonal frequency division multiplexing (OFDM) in the downlink and discrete Fourier transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval.

As shown in FIG. 2, in the time domain, LTE downlink transmissions are organized into radio frames of 10 ms, each radio frame consisting of ten equally-sized subframes of length $T_{subframe}$=1 ms.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. A physical resourced block (PRB) pair is defined by the two resource blocks occupying the same 12 contiguous subcarriers in the frequency domain and the two slots within a subframe in the time domain.

Downlink transmissions are dynamically scheduled, i.e., in each subframe the base station transmits control information over a physical downlink control channel (PDCCH), in the current downlink subframe. This control signaling is typically transmitted in the first 1, 2, 3 or 4 OFDM symbols in each subframe. A downlink system with 3 OFDM symbols as control is illustrated in FIG. 3. From LTE Release 11 onwards, the above described resource assignments can also be scheduled on the Enhanced Physical Downlink Control Channel (EPDCCH). For LTE Rel-8 to Rel-10 only Physical Downlink Control Channel (PDCCH) is available.

LTE uses hybrid automated repeat request (HARQ), where, after receiving downlink data in a subframe, the terminal attempts to decode it and reports to the base station whether the decoding was successful (ACK) or not (NAK). In case of an unsuccessful decoding attempt, the base station can retransmit the erroneous data. Uplink control signaling from the terminal to the base station consists of HARQ acknowledgements for received downlink data; terminal reports related to the downlink channel conditions, used as assistance for the downlink scheduling; scheduling requests, indicating that a mobile terminal needs uplink resources for uplink data transmissions.

In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. This is shown in FIG. 4. If more resources are needed for the uplink L1/L2 control signaling, e.g., in case of very large overall transmission bandwidth supporting a large number of users, additional resources blocks can be assigned next to the previously assigned resource blocks.

As mentioned above, uplink L1/L2 control signaling include hybrid-ARQ acknowledgements, channel state information and scheduling requests. Different combinations of these types of messages are possible as described further below, but to explain the structure for these cases it is beneficial to discuss separate transmission of each of the types first, starting with the hybrid-ARQ and the scheduling request. There are 5 formats defined for PUCCH in Rel-13, each capable of carrying a different number of bits. For this background art, PUCCH formats 2 and 3 are the most noteworthy.

Wireless devices can report channel state information (CSI) to provide the base station, e.g., (eNB), with an estimate of the channel properties at the terminal in order to aid channel-dependent scheduling. A CSI report consists of multiple bits per subframe transmitted in the uplink control information (UCI) report. Physical uplink control channel (PUCCH) format 1, which is capable of at most two bits of information per subframe, can obviously not be used for this purpose. Transmission of CSI reports on the PUCCH in Rel-13 is instead handled by PUCCH formats 2, 3, 4, and 5, which are capable of multiple information bits per subframe.

PUCCH format 2 resources are semi-statically configured. A Format 2 report can carry a payload of at most 11 bits. Variants of format 2 are format 2a and 2b which also carries HARQ-ACK information of 1 and 2 bits respectively for normal cyclic prefix. For extended cyclic prefix, PUCCH Format 2 can also carry HARQ-ACK information. For simplicity, they are all referred to as format 2 herein.

Because PUCCH payloads are constrained, LTE defines CSI reporting types that carry subsets of CSI components (such as channel quality index (CQI), precoding matrix indicator (PMI), rank indicator (RI), and CSI-RS resource indicator (CRI)). Together with the PUCCH reporting mode and 'Mode State', each reporting type defines a payload that can be carried in a given PUCCH transmission, which is given in 3GPP TS 36.213, Table 7.2.2-3. In Rel-13, all PUCCH reporting types have payloads that are less than or equal to 11 bits, and so all can be carried in a single PUCCH format 2 transmission.

Various CSI reporting types are defined in Rel-13 LTE:
Type 1 report supports CQI feedback for the wireless device selected subbands
Type 1a report supports subband CQI and second PMI feedback
Type 2, Type 2b, and Type 2c report supports wideband CQI and PMI feedback
Type 2a report supports wideband PMI feedback
Type 3 report supports RI feedback
Type 4 report supports wideband CQI
Type 5 report supports RI and wideband PMI feedback
Type 6 report supports RI and PTI feedback Type 7 report support CRI and RI feedback Type 8 report supports CRI, RI and wideband PMI feedback Type 9 report supports CRI, RI and PTI feedback Type 10 report supports CRI feedback These reporting types are transmitted on PUCCH with periodicities and offsets (in units of subframes) determined according to whether CQI, Class A first PMI, RI, or CRI are carried by the reporting type. Table 1 shows the subframes when the various reporting types are transmitted assuming that wideband CSI reports are used with a single CSI subframe set. Similar mechanisms are used for subband reporting and for multiple subframe sets.

TABLE 1

| CSI content | CSI Reporting Type | Subframe in which wideband CSI reporting type(s) are transmitted |
|---|---|---|
| CQI | 1, 1a, 2, 2b, 2c, 4 | $(10 \times n_f + \lfloor n_s/2 \rfloor - N_{OFFSET,CQI}) \bmod (N_{pd}) = 0$ |
| Class A first PMI | 2a | $(10 \times n_f + \lfloor n_s/2 \rfloor - N_{OFFSET,CQI}) \bmod (H' \cdot N_{pd}) = 0$ |
| RI | 3, 5 | $(10 \times n_f + \lfloor n_s/2 \rfloor - N_{OFFSET,CQI} - N_{OFFSET,RI}) \bmod (N_{pd} \cdot M_{RI}) = 0$ |
| CRI* | 7, 8, 9, 10 | $(10 \times n_f + \lfloor n_s/2 \rfloor - N_{OFFSET,CQI} - N_{OFFSET,RI}) \bmod (N_{pd} \cdot M_{RI} \cdot M_{CRI}) = 0$ |

*Note that this is for the case where more than one CSI-RS port is configured.

Where (as defined in 3GPP TSs 36.213 and 36.331):

$n_f$ is the system frame number $n_s$ is the slot number within a radio frame $N_{pd}$ is a periodicity in subframes set by the higher layer parameter cqi-pmi-ConfigIndex $N_{OFFSET,CQI}$ is an offset in subframes set by the higher layer parameter cqi-pmi-ConfigIndex H' is set by the higher layer parameter periodicityFactorWB $M_{RI}$ is periodicity multiple in subframes set by the higher layer parameter ri-ConfigIndex $N_{OFFSET,RI}$ is an offset in subframes set by the higher layer parameter ri-ConfigIndex $M_{CRI}$ is periodicity multiple in subframes set by the higher layer parameter cri-ConfigIndex It can be observed that PUCCH CSI reporting has a fundamental periodicity of $N_{pd}$ subframes, and that CQI can be reported at this rate. If RI is configured, it can also be reported at the same rate as CQI, since an offset $N_{OFFSET,RI}$ can allow RI to have different shifts of the same periodicity as CQI. On the other hand, Class A first PMI is time multiplexed in with CQI, being transmitted instead of CQI in one of out of H' transmissions of CQI and Class A first PMI. CRI is time multiplexed in with RI in a similar way: CRI is transmitted instead of RI in one of out of $M_{CRI}$ transmissions of RI and CRI.

It is also worth noting that PUCCH format 3 can carry ACK/NACK and CSI in the same PUCCH transmission, but the CSI must be from only one serving cell.

LTE control signaling can be carried in a variety of ways, including carrying control information on PDCCH, EPDCCH or PUCCH, embedded in the PUSCH, in MAC control elements ('MAC CEs'), or in radio resource control (RRC) signaling. Each of these mechanisms is customized to carry a particular kind of control information.

Control information carried on physical downlink control channel (PDCCH), evolved PDCCH (EPDCCH), PUCCH, or embedded in physical uplink shared channel (PUSCH) is physical layer related control information, such as downlink control information (DCI), uplink control information (UCI), as described in 3GPP TS 36.211, 36.212, and 36.213. DCI is generally used to instruct the wireless device to perform some physical layer function, providing the needed information to perform the function. UCI generally provides the network with needed information, such as HARQ-ACK, scheduling request (SR), channel state information (CSI), including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in medium access control (MAC) control elements (CEs) is carried in MAC headers on the uplink and downlink shared transport channels (UL-SCH and DL-SCH), as described in 3GPP TS 36.321. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded (whereas UCI and DCI can't be in Rel-13). MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in Rel-13.

Dedicated RRC control information is also carried through UL-SCH and DL-SCH, but using signaling radio bearers (SRBs), as discussed in 3GPP TS 36.331. Consequently, it can also carry large control payloads efficiently. However, SRBs are not generally intended for very frequent transmission of large payloads, and need to be available to support less frequent signaling that should be highly reliably transmitted, such as for mobility procedures including handover. Therefore, similar to the MAC, RRC signaling does not carry channel state information related to a fast fading radio channel, such as PMI, CQI, RI, and CRI in Rel-13. In fact, this kind of CSI is only carried in UCI signaling on PUSCH or PUCCH.

The PDCCH/EPDCCH is used to carry downlink control information (DCI) such as scheduling decisions and power-control commands. More specifically, the DCI includes:

Downlink scheduling assignments, including PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments.

Uplink scheduling grants, including PUSCH resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH/EPDCCH carries one DCI message with one of the formats above. As multiple terminals can be scheduled simultaneously, on both downlink and uplink, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each cell. Furthermore, to support different radio-channel conditions, link adaptation can be used, where the code rate of the PDCCH/EPDCCH is selected by adapting the resource usage for the PDCCH/EPDCCH, to match the radio-channel conditions.

An uplink grant can be sent using either DCI format 0 or DCI format 4, depending on the uplink transmission mode configured. For wireless devices supporting uplink MIMO transmission, DCI4 is used. Otherwise, DCI0 is used. For uplink data transmission on Physical Uplink Shared Channel (PUSCH), Demodulation Reference Signal (DMRS) is used for channel estimation at the base station receiver. A DMRS sequence is defined by a cyclic shift of a base sequence and a length 2 orthogonal cover code (OCC). When MIMO is supported in the uplink, a DMRS sequence is needed for each MIMO layer. Up to 4 layers are supported in uplink MIMO, thus up to four DMRS sequences and OCC codes are needed.

The cyclic shifts and OCC codes are dynamically signalled in DCI0 or DCI4 through a 3 bits Cyclic Shift Fields. This field is used to indicate a cyclic shift parameter, $n_{DMRS,\lambda}^{(2)}$, and a length 2 OCC code, $w^{\lambda}$, where $\lambda=0, 1, \ldots, v-1$ and v is the number of layers to be transmitted in the PUSCH scheduled by the uplink grant. The exact mapping is shown in Table 5.5.2.1.1-1 of 3gpp specification 36.211, which has been copied below in TABLE 2.

Up to 4 (v=4) layers of PUSCH transmission are supported in the uplink. Each layer has an associated DMRS sequence specified by a cyclic shift and a length 2 OCC code if OCC for DMRS is activated, $n_{DMRS,\lambda}^{(2)}$ is used to derive the cyclic shift of DMRS for PUSCH.

TABLE 2

| Cyclic Shift Field in uplink-related DCI format | $n_{DMRS,\lambda}^{(2)}$ | | | | $[w^{(\lambda)}(0)\ w^{(\lambda)}(1)]$ | | | |
| --- | --- | --- | --- | --- | --- | --- | --- | --- |
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

An aperiodic CSI request is indicated in the CSI Request field in DCI format 0 or DCI format 4. The number of bits in the field varies from 1 bit to 3 bits, depending on wireless device configuration. For example, for wireless devices configured with less than 5 carriers (or cells) or multiple CSI-RS processes, 2 bits are used and for wireless devices configured with more than 5 carriers, 3 bits are used. In case that a wireless device is configured with a single carrier (i.e. serving cell c) and 2 sets of CSI-RS processes, the CSI request field is shown in Table 3.

TABLE 3

| Value of CSI request field | Description |
| --- | --- |
| '00' | No aperiodic CSI report is triggered |
| '01' | Aperiodic CSI report is triggered for a set of CSI process(es) configured by higher layers for serving cell$_c$ |
| '10' | Aperiodic CSI report is triggered for a 1$^{st}$ set of CSI process(es) configured by higher layers |
| '11' | Aperiodic CSI report is triggered for a 2$^{nd}$ set of CSI process(es) configured by higher layers |

A discovery reference signal (DRS) occasion has been defined as a duration within which discovery signals are transmitted by a cell. The reference signals included in the DRS occasion on a cell are shown in FIG. 5, where the elements 10 are the resource elements used for CSI-RS belonging to DRS and the elements 12 indicate potential CSI-RS belonging to DRS. While the discovery signals enable small cell on/off, they can also be utilized when small cell on/off is not being used in a cell.

The discovery signals in a DRS occasion are comprised of the PSS, SSS, CRS and when configured, the channel state information reference signals (CSI-RS). The PSS and SSS are used for coarse synchronization, when needed, and for cell identification. The CRS is used for fine time and frequency estimation and tracking and may also be used for cell validation, i.e., to confirm the cell ID detected from the PSS and SSS. The CSI-RS is another signal that can be used in dense deployments for cell or transmission point (TP) identification. FIG. 5 shows the presence of these signals in a DRS occasion of length equal to two subframes and also shows the transmission of the signals over two different cells or transmission points. Elements 1 indicate used resource elements for CSI-RS belonging to DRS and shaded elements 2, for example, indicate potential CSI-RS belonging to DRS.

The DRS occasion corresponding to transmissions from a particular cell may range in duration from one to five subframes for FDD and two to five subframes for TDD. The subframe in which the SSS occurs marks the starting subframe of the DRS occasion. This subframe is either subframe 0 or subframe 5 in both FDD and TDD. In TDD, the PSS appears in subframe 1 and subframe 6 while in FDD the PSS appears in the same subframe as the SSS. The CRS are transmitted in all downlink subframes and DwPTS regions of special subframes.

The CSI-RS may be transmitted in any of the downlink subframes, but with any restrictions associated with each subframe. For the purposes of the discovery signal, only a single port (port 15) of CSI-RS is transmitted. There are up to twenty possible RE configurations within a subframe although the number of configurations is restricted to five in subframe 0 (to account for transmission of PBCH which use many of the same REs in the six PRBs centered around the carrier frequency) and to 16 in subframe 5. In a DRS occasion transmitted from a cell, a CSI-RS intended to be representing a single measurable entity, loosely referred to as a transmission point, can occur in any RE configuration in any of the downlink subframes that are part of the DRS occasion. Thus, considering that the DRS occasion may be up to five subframes long in an FDD frame structure, the largest possible number of CSI-RS RE configurations is 96. This occurs when the DRS occasion starts with subframe 5 (DRS occasion starting in subframe 0 would support fewer CSI-RS RE configurations) and consists of 16 configurations in subframe 5 and 20 in each of the four following subframes.

It is possible for a cell or transmission point to transmit CSI-RS signals in some RE configurations and transmit nothing in other CSI-RS RE configurations. The RE configurations where some signals are transmitted are then indicated to the wireless device as non-zero-power (NZP) CSI-RS RE configurations while the configurations where nothing is transmitted are indicated as zero-power (ZP) CSI-RS RE configurations. Using the non-zero-power and zero-power RE configurations, CSI-RS signals from two different cells or transmission points can be effectively made orthogonal as shown in FIG. 5.

In each RE configuration, the symbols transmitted in the resource elements may be scrambled with a sequence dependent on a virtual or configurable cell ID (VCID) which can take the same set of values as the Rel-8 cell ID, i.e., up to 504 values. Although this creates the possibility of a very large number of CSI-RS possibilities, two CSI-RS being transmitted with different scrambling codes over the same REs are not orthogonal. Hence, it is less robust to separate different CSI-RS transmissions using only scrambling codes as compared to using different RE configurations.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. Currently, Release 13 LTE-Advanced Pro supports an 8-layer spatial multiplexing mode for up to 16 Transmit antenna ports with channel dependent precoding. The spatial multiplexing mode is aimed for high data rates in favorable channel conditions. An illustration of the spatial multiplexing operation is provided in FIG. 6.

As seen in FIG. 6, the information carrying symbol vector s from layers 3 is multiplied by an $N_T \times r$ precoder matrix W 4, which serves to distribute the transmit energy in a subspace of the $N_T$ (corresponding to $N_T$ antenna ports) dimensional vector space via an inverse fast Fourier transform (IFFT) 5. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink, and DFT (Discrete Fourier Transform) precoded OFDM in the uplink. Hence, the received $N_R \times 1$ vector $y_n$ for a certain TFRE on subcarrier n (or alternatively data TFRE number n) is thus modeled by $$y_n = H_n W s_n + e_n \qquad \text{Equation 1}$$

where $e_n$ is a noise/interference vector obtained as realizations of a random process. The precoder W can be a wideband precoder (that is, the precoder is constant over the whole scheduled band) or frequency selective (that is, the precoder can vary within the whole scheduled band).

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the wireless device. In addition, the precoder matrix may also be selected to strive for orthogonalizing the channel, meaning that after proper linear equalization at the wireless device, the inter-layer interference is reduced.

One example method for a wireless device to select a precoder matrix W can be to select the $W_k$ that maximizes the Frobenius norm of the hypothesized equivalent channel:

$$\max_k \left\| \hat{H}_n W_k \right\|_F^2 \qquad \text{Equation 2}$$

where, $\hat{H}_n$ is a channel estimate, possibly derived from CSI-RS as described below.

$W_k$ is a hypothesized precoder matrix with index k.

$\hat{H}_n W_k$ is the hypothesized equivalent channel.

In closed-loop precoding for the LTE downlink, the wireless device transmits, based on channel measurements in the forward link (downlink), recommendations to the base station of a suitable precoder to use. The base station configures the wireless device to provide feedback according to the wireless device's transmission mode, and may transmit CSI-RS and configure the wireless device to use measurements of CSI-RS to feedback recommended precoding matrices that the wireless device selects from a codebook. A single precoder that is supposed to cover a large bandwidth (wideband precoding) may be fed back. It may also be beneficial to match the frequency variations of the channel and instead feedback a frequency-selective precoding report, e.g. several precoders, one per subband. This is an example of the more general case of channel state information (CSI) feedback, which also encompasses feeding back other information than recommended precoders to assist the base station in subsequent transmissions to the wireless device. Such other information may include channel quality indicators (CQIs) as well as transmission rank indicator (RI).

With regards to CSI feedback, a subband is defined as a number of adjacent PRB pairs. In LTE, the subband size (i.e., the number of adjacent PRB pairs) depends on the system bandwidth, whether CSI reporting is configured to be periodic or aperiodic, and feedback type (i.e., whether higher layer configured feedback or wireless device-selected subband feedback is configured). An example illustrating the difference between subband and wideband is shown in FIG. 7. In the example, the subband consists of 6 adjacent PRBs.

Note that only 2 subbands are shown in FIG. 7 for simplicity of illustration. Generally, all the PRB pairs in the system bandwidth are divided into different subband where each subband consists of a fixed number of PRB pairs. In contract, wideband involves all the PRB pairs in the system bandwidth. As mentioned above, a wireless device may feedback a single precoder that takes into account the measurements from all PRB pairs in the system bandwidth if it is configured to report wideband PMI by the base station. Alternatively, if the wireless device is configured to report subband PMI, a wireless device may feedback multiple precoders with one precoder per subband. In addition, to the subband precoders, the wireless device may also feedback the wideband PMI.

In LTE, two types of subband feedback types are possible for PUSCH CSI reporting: (1) Higher layer configured subband feedback and (2) wireless device selected subband feedback. With higher layer configured subband feedback, the wireless device may feedback PMI and/or CQI for each of the subbands. The subband size in terms of the number of PRB pairs for higher layer configured subband feedback is a function of system bandwidth and is listed in Table 4. With wireless device selected subband feedback, the wireless device only feeds back PMI and/or CQI for a selected number of subbands out of all the subbands in the system bandwidth. The subband size in terms of the number of PRB pairs and the number of subbands to be fed back are a function of the system bandwidth and are listed in Table 5.

TABLE 4

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

TABLE 5

| System Bandwidth $N_{RB}^{DL}$ | Subband Size k (RBs) | Number of Subbands |
|---|---|---|
| 6-7 | NA | NA |
| 8-10 | 2 | 1 |
| 11-26 | 2 | 3 |
| 27-63 | 3 | 5 |
| 64-110 | 4 | 6 |

Given the CSI feedback from the wireless device, the base station determines the transmission parameters it wishes to use to transmit to the wireless device, including the precoding matrix, transmission rank, and modulation and coding state (MCS). These transmission parameters may differ from the recommendations the wireless device makes. Therefore, a rank indicator and MCS may be signaled in downlink control information (DCI), and the precoding matrix can be signaled in DCI or the base station can transmit a demodulation reference signal from which the equivalent channel (i.e., the equivalent channel including the effective channel and precoding matrix used by the base station) can be measured. The transmission rank, and thus the number of spatially multiplexed layers, is reflected in the number of columns of the precoder W. For efficient performance, a transmission rank that matches the channel properties should be selected.

In LTE Release-10, a new reference symbol sequence was introduced for the intent to estimate downlink channel state information, the CSI-RS (channel state information reference signal). The CSI-RS provides several advantages over basing the CSI feedback on the common reference signals (CRS) which were used, for that purpose, in LTE Releases 8-9. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a wireless device specific manner).

By measuring a CSI-RS transmitted from the base station, a wireless device can estimate the effective channel the CSI-RS is traversing including the radio propagation channel and antenna gains. In more mathematical rigor this implies that if a known CSI-RS signal x is transmitted, a wireless device can estimate the coupling between the transmitted signal and the received signal (i.e., the effective channel). Hence if no virtualization is performed in the transmission, the received signal y can be expressed as $$y=Hx+e \qquad \text{Equation 3}$$

and the wireless device can estimate the effective channel H.

Up to eight CSI-RS ports can be configured in LTE Rel-10, that is, the wireless device can estimate the channel from up to eight transmit antenna ports. In LTE Release 13, the number of CSI-RS ports that can be configured is extended to up to sixteen ports. In LTE Release 14, supporting up to 32 CSI-RS ports is under consideration.

Related to CSI-RS is the concept of zero-power CSI-RS resources (also known as a muted CSI-RS) that are configured just as regular CSI-RS resources, so that a wireless device knows that the data transmission is mapped around those resources. The intent of the zero-power CSI-RS resources is to enable the network to mute the transmission on the corresponding resources in order to boost the signal to interference plus noise ratio (SINR) of a corresponding non-zero power CSI-RS, possibly transmitted in a neighbor cell/transmission point. In Release-11 of LTE, a special zero-power CSI-RS was introduced that a wireless device is mandated to use for measuring interference plus noise. A wireless device can assume that the TPs of interest are not transmitting on the zero-power CSI-RS resource, and the received power can therefore be used as a measure of the interference plus noise.

Based on a specified CSI-RS resource and on an interference measurement configuration (e.g., a zero-power CSI-RS resource), the wireless device can estimate the effective channel and noise plus interference, and consequently also determine the rank, precoding matrix, and MCS to recommend to best match the particular channel.

Advanced codebooks with multi-beam precoders may lead to better MU-MIMO performance, but at the cost of increased CSI feedback overhead. It is an open problem of how an efficient multi-beam codebook that results in good MU-MIMO performance but low feedback overhead should be constructed.

SUMMARY

Some embodiments advantageously provide a methods, wireless devices and network nodes for reducing signaling overhead in a wireless communication system. Some embodiments include a method for a wireless device configured to adjust uplink signaling overhead. The method includes receiving signaling that configures the wireless device with a first number of beams, N. The method also includes determining N power values, each power value corresponding to one of the N beams. The method also includes including channel state information, CSI, in a CSI report, the CSI pertaining to one or more beams whose corresponding power value is above a predetermined power value.

In some embodiments, the method further includes determining whether the number of beams, N, is equal to one or greater than one using a signal to interference plus noise ratio, SINR. In some embodiments, the method further includes transmitting signaling by the wireless device indicating at least one of: N power values, each power value corresponding to one of the N beams, and a second number of beams, M', whose corresponding power value is above a predetermined value. In some embodiments, the first number of beams is signaled via radio resource control, RRC. In some embodiments, the predetermined power value represents a power ratio with respect to a beam with a maximum received power. In some embodiments, a signal to interference plus noise ratio, SINR, is additionally used by the wireless device to determine whether the number of beams is equal to one or greater than one.

In some embodiments, each beam of the first beam (128) and second beams is a kth beam, d(k), that has associated a set of complex numbers and has index pair ($l_k$, $m_k$), each element of the set of complex numbers being characterized by at least one complex phase shift such that:

$d_n(k) = d_i(k)\alpha_{i,n} e^{j2\pi(p\Delta_{1,k} + q\Delta_{2,k})}$;

$d_n(k)$, and $d_i(k)$ are the $i^{th}$ and $n^{th}$ elements of d(k), respectively;

$\alpha_{i,n}$ is a real number corresponding to the $i^{th}$ and $n^{th}$ elements of d(k);

p and q are integers;

beam directions $\Delta_{1,k}$ and $\Delta_{2,k}$ are real numbers corresponding to beams with index pair ($l_k$, $m_k$) that determine the complex phase shifts $e^{j2\pi\Delta_{1,k}}$ and $e^{j2\pi\Delta_{2,k}}$ respectively; and each of the at least a co-phasing coefficient between the first and second beam (S130) is a complex number $c_k$ for d(k) that is used to adjust the phase of the $i^{th}$ element of d(k) according to $c_k d_i(k)$.

In some embodiments, a wireless device is configured for reduced uplink signaling overhead. The wireless device includes processing circuitry configured to store a number of beams, N, to be included in a multiple beam precoder codebook, the number of N beams being received from a network node and further configured to perform at least one of: determine N power values, each power value corresponding to one of the N beams; and include CSI in the CSI report, the CSI pertaining to one or more beams whose corresponding power value is above a predetermined power valued.

In some embodiments, the processor is further configured to determine whether the number of beams is equal to one or greater than one using an SINR. In some embodiments, the wireless device includes a transceiver configured to transmit signaling by the wireless device indicating at least one of: N power values, each power value corresponding to one of the N beams; and a second number of beams, M', whose corresponding power value is above a predetermined value. In some embodiments, the first number of beams is signaled via radio resource control, RRC. In some embodiments, the predetermined power value represents a power ratio with respect to a beam with a maximum received power. In some embodiments, a signal to interference plus noise ratio, SINR, is additionally used by the wireless device to determine whether the number of beams is equal to one or greater than one. In some embodiments, each beam of the first number of beams (128) and second number of beams is a kth beam, d(k), that has associated a set of complex numbers and has index pair ($l_k$, $m_k$), each element of the set of complex numbers being characterized by at least one complex phase shift such that:

$d_n(k) = d_i(k)\alpha_{i,n} e^{j2\pi(p\Delta_{1,k} + q\Delta_{2,k})}$;

$d_n(k)$, and $d_i(k)$ are the $i^{th}$ and $n^{th}$ elements of d(k), respectively;

$\alpha_{i,n}$ is a real number corresponding to the $i^{th}$ and $n^{th}$ elements of d(k);

p and q are integers;

beam directions $\Delta_{1,k}$ and $\Delta_{2,k}$ are real numbers corresponding to beams with index pair ($l_k$, $m_k$) that determine the complex phase shifts $e^{j2\pi\Delta_{1,k}}$ and $e^{j2\pi\Delta_{2,k}}$ respectively; and each of the at least a co-phasing coefficient between the first and second beam (S130) is a complex number $c_k$ for d(k) that is used to adjust the phase of the $i^{th}$ element of d(k) according to $c_k d_i(k)$.

In some embodiments, a wireless device is configured for reduced uplink signaling overhead. The wireless device includes a memory module configured to store a number of beams to be included in a multiple beam precoder codebook, the number of beams, N, being received from a network node. The wireless device includes a beam power value determiner module configured to determine N power values, each power value corresponding to one of the N beams. The wireless device further includes a CSI report generator module configured to include CSI in the CSI report, the CSI pertaining to one or more beams whose corresponding power value is above a predetermined power value.

In some embodiments, a method in a network node for determining the size of a channel state information (CSI) report produced by a wireless device is provided. The method includes transmitting to the wireless device configuration information with a first number of beams, N. The method further includes receiving signaling from the wireless device indicating at least one of: N power values, each power value corresponding to one of N beams, and a second number of beams, M', whose corresponding power value is above the predetermined value. The method further includes receiving the CSI report containing CSI pertaining to one or more beams whose corresponding power value is above the predetermined power value. The method further includes determining the size of the CSI report produced by the wireless device.

In some embodiments, the method further includes receiving the signaling in a first transmission including a medium access control, MAC, control element and receiving additional components of the CSI report in a second transmission on a physical uplink shared channel, PUSCH. In some embodiments, the method further includes receiving the signaling in a periodic report on a physical uplink control channel, PUCCH, and receiving additional components of the CSI report in a second transmission on a physical uplink shared channel, PUSCH. In some embodiments, the method further includes configuring the wireless device with a higher layer parameter to specify in which subframes the signaling from the wireless device is received. In some embodiments, the method further includes receiving the signaling in an aperiodic report on a physical uplink shared channel, PUSCH, and receiving additional components of the CSI report in a different report on the PUSCH. In some embodiments, the method further includes receiving the signaling on a physical uplink shared channel, PUSCH, that carries additional components of the CSI report. In some embodiments, the method further includes decoding the signaling followed by determining the size of the CSI report. In some embodiments, the first number of beams is signaled via radio resource control, RRC.

In some embodiments, a network node configured to determine the size of a channel state information (CSI) report produced by a wireless device is provided. The network node includes a memory configured to store a predetermined power value. The network node also includes a transceiver configured to: transmit to the wireless device configuration information with a first number of beams, N. The transceiver is also configured to receive signaling from the wireless device indicating at least one of: N power values, each power value corresponding to one of N beams; and a second number of beams, M', whose corresponding power value is above the predetermined value. The transceiver is also configured to receive the CSI report containing CSI pertaining to one or more beams whose corresponding power value is above the predetermined power value. The network node also includes a processor configured to determine the size of the CSI report produced by the wireless device.

In some embodiments, the transceiver is further configured to receive the signaling in a first transmission including a medium access control, MAC, control element and receiving additional components of the CSI report in a second transmission on a physical uplink shared channel, PUSCH. In some embodiments, the transceiver is also configured to receive the signaling in a periodic report on a physical uplink control channel, PUCCH, and receiving additional components of the CSI report in a second transmission on a physical uplink shared channel, PUSCH. In some embodiments, the network node is further configured to configure the wireless device with a higher layer parameter to specify in which subframes the signaling from the wireless device is received. In some embodiments, the transceiver is further configured to receive the signaling in an aperiodic report on a physical uplink shared channel, PUSCH, and receiving additional components of the CSI report in a different report on the PUSCH. In some embodiments, the transceiver is further configured to receive the signaling on a physical uplink shared channel, PUSCH, that carries additional components of the CSI report. In some embodiments, the processor is further configured to decode the signaling followed by determining the size of the CSI report. In some embodiments, the first number of beams is signaled via radio resource control, RRC.

In some embodiments, a network node configured to determine the size of a channel state information, CSI, report produced by a wireless device is provided. The network node includes a memory module configured to store a predetermined power value. The network node further includes a transceiver module configured to transmit to the wireless device configuration information with a first number of beams, N. The transceiver module is further configured to receive signaling from the wireless device indicating at least one of: N power values, each power value corresponding to one of N beams, and a second number of beams, M', whose corresponding power value is above the predetermined value. The transceiver module is further configured to receive the CSI report containing CSI pertaining to one or more beams whose corresponding power value is above the predetermined power value. The network node further includes a CSI report size determiner module configured to determine the size of the CSI report produced by the wireless device.

In some embodiments, a method in a network node for determining the size of a channel state information (CSI) report produced by a wireless device is provided. The method includes configuring the wireless device with a first number of beams, N. The method further includes receiving signaling from the wireless device indicating at least one of: N power values, each power value corresponding to one of N beams, and a second number of beams, M', whose corresponding power value is above a predetermined value. The method further includes receiving the CSI report from the wireless device, the CSI report containing CSI pertaining to one or more beams whose corresponding power value is above the predetermined power value. The method further includes determining the size of the CSI report.

The network node includes processing circuitry configured to store a first number of beams, N, and a second number of beams, M'. A transceiver is configured to receive at least one of: N power values, each power value corresponding to one of N beams, and a second number of beams, M', whose corresponding power value is above a predetermined value. The transceiver is configured to receive the CSI report from the wireless device, the CSI report containing CSI pertaining to one or more beams whose corresponding power value is above the predetermined power value. The processing circuitry is further configured to determine the size of the CSI report.

In some embodiments, a network node configured to determine the size of a channel state information (CSI) report produced by a wireless device is provided. The network node includes a memory module configured to store a first number of beams N and a second number of beams, M'. The network node further includes a transceiver module configured to receive at least one of: N power values, each power value corresponding to one of N beams, and a second number of beams, M', whose corresponding power value is above a predetermined value. The transceiver module is also configured to receive the CSI report from the wireless device, the CSI report containing CSI pertaining to one or more beams whose corresponding power value is above the predetermined power value. The network node further includes a CSI report size determiner module configured to determine the size of the CSI report.

In some embodiments, a method for determining at a network node a number of beams to be used by a wireless device when generating a multi-beam channel state information, CSI, report is provided. The method includes transmitting a plurality of distinct reference signals. The method also includes configuring the wireless device to measure and report a received power to the network node for each of the distinct reference signals. The method further includes determining the number of beams, and signaling the number of beams to the wireless device.

In some embodiments, a network node configured to determine a number of beams to be used by a wireless device when generating a multi-beam channel state information, CSI, report is provided. The network node includes processing circuitry configured to store CSI reports and cause transmission of a plurality of distinct reference signals. The processing circuitry is also configured to configure the wireless device to measure and report a received power to the network node for each of the distinct reference signal. The processing circuitry is also configured to determine the number of beams. A transceiver is configured to signal the number of beams to the wireless device.

In some embodiments, a network node configured to determine a number of beams to be used by a wireless device when generating a multi-beam channel state information, CSI, report is provided. The network node includes a memory module configured to store CSI reports. The network node includes a transmitter module configured to transmit a plurality of distinct reference signals. A configuration determiner module is configured to configure the wireless device to measure and report a received power to the network node for each of the distinct reference signals. A beam number determiner module is configured to determine the number of beams. The transmitter module is configured to signal the number of beams to the wireless device.

In some embodiments, a method in a wireless device for reducing uplink feedback overhead for a wireless device operating in a selective subband feedback mode is provided. The method includes determining a number of subbands to be fed back to a network node based on a system bandwidth and a number of beams to include in a multi-beam precoder codebook. In some embodiments, a size of a subband is a function of the number of beams.

In some embodiments, a wireless device for operating in a selective subband feedback mode is provided. The wireless device includes processing circuitry configured to store a number of subbands to be fed back to a network node and determine the number of subbands to be fed back based on a system bandwidth and a number of beams to be included in a multi-beam precoder codebook. In some embodiments, a size of a subband is a function of the number of beams.

In some embodiments, a wireless device for operating in a selective subband feedback mode is provided. The wireless device includes a memory module configured to store a number of subbands to be fed back to a network node. The method includes a subband number determiner module configured to determine the number of subbands to be fed back based on a system bandwidth and a number of beams to be included in a multi-beam precoder codebook.

According to one aspect, a method includes transmitting to the wireless device at least one power of: a threshold parameter to be used by the wireless device to determine a number of beams to be included in a multi-beam precoder codebook, and a signal to interference plus noise ratio, SINR, to be used by the wireless device to determine to use one of a single beam precoder and a multiple beam precoder.

According to this aspect, in some embodiments, the at least one power threshold parameter are signaled via radio resource control, RRC, and can be associated with a non-zero power channel state information reference signal, CSI-RS, identifier. In some embodiments, different power threshold parameters are applicable to different transmission ranks.

In some embodiments, a power threshold parameter represents a power ratio with respect to a beam with a maximum received power. In some embodiments, the wireless device is configured by the network node to include only beams having a power component exceeding a threshold in a multi-beam precoder code book.

According to another aspect, a network node configured to configure a wireless device. The network node includes processing circuitry configured to store power threshold parameters and determine a number of beams to be included in a multi-beam precoder codebook. A transceiver is configured to transmit to the wireless device at least one of: a power threshold parameter to be used by the wireless device to determine a number of beams to be included in a multi-beam precoder codebook and a signal to interference plus noise ratio, SINR, to be used by the wireless device to determine to use one of a single beam precoder and a multiple beam precoder.

According to this aspect, in some embodiments, the at least one power threshold parameter are signaled via radio resource control, RRC, and can be associated with a non-zero power channel state information reference signal, CSI-RS, identifier. In some embodiments, different power threshold parameters are applicable to different transmission ranks. In some embodiments, a power threshold parameter represents a power ratio with respect to a beam with a maximum received power. In some embodiments, the wireless device is configured by the network node to include only beams having a power component exceeding a threshold in a multi-beam precoder code book.

According to another aspect, a method in a network node configured to determine a number of beams to include in a multi-beam precoder codebook by a wireless device. The method includes receiving from the wireless device the number of beams to be included in a multi-beam precoder codebook and determining an uplink control information payload size on the UL shared channel based on the number of beams.

According to this aspect, the network node is configured to receive the number of beams in a first transmission including a medium access control, MAC, element and to received additional CSI components in a second transmission on a physical uplink shared channel, PUSCH. In some embodiments, the network node is configured to receive the number of beams in a periodic report on a physical uplink control channel and to receive additional CSI components in a second transmission on a physical uplink shared channel, PUSCH. In some embodiments, the network node is further configured to semi-statically configure the wireless device with a higher layer parameter to specify in which subframes the wireless device reports the number of beams. In some embodiments, the network node is configured to receive the number of beams in an aperiodic report on a physical uplink shared channel, PUSCH, and to receive additional CSI components in a different report on the PUSCH.

According to another aspect, a network node configured to configure a wireless device is provided. The network node includes processing circuitry configured to store a number of beams to be included in a multi-beam precoder codebook and determine an uplink control information payload size based on the number of beams on the UL shared channel. The network node also includes a transceiver configured to receive the number of beams.

According to this aspect, the network node is configured to receive the number of beams in a first transmission including a medium access control, MAC, element and to received additional CSI components in a second transmission on a physical uplink shared channel, PUSCH. In some embodiments, the network node is configured to receive the number of beams in a periodic report on a physical uplink control channel and to receive additional CSI components in a second transmission on a physical uplink shared channel, PUSCH.

In some embodiments, the network node is further configured to semi-statically configure the wireless device with a higher layer parameter to specify in which subframes the wireless device reports the number of beams. In some embodiments, the network node is configured to receive the number of beams in an aperiodic report on a physical uplink shared channel, PUSCH, and to receive additional CSI components in a different report on the PUSCH.

According to yet another aspect, a method for determining at a network node a number of beams to be used by a wireless device when generating a multi-beam channel state information, CSI, report is provided. The method includes transmitting a plurality of orthogonal beams on different reference signals, determining a configuration of the wireless device to measure and report a received power for each reference signal, and calculating a number of beams to be used by the wireless device when generating the multi-beam CSI report based on the power reports.

According to this aspect, in some embodiments, the network node calculates the number of beams by using measurements on a sounding reference signal transmitted by the wireless device on the uplink.

According to another aspect, a network node is configured to determine a number of beams to be used by a wireless device when generating a multi-beam channel state information, CSI, report. The network node includes processing circuitry configured to store CSI reports and determine a configuration of the wireless device to measure and report a received power for each reference signal, and calculate a number of beams to be used by the wireless device when generating the multi-beam CSI report based on the power reports.

According to this aspect, in some embodiments, the network node calculates the number of beams by using measurements on a sounding reference signal transmitted by the wireless device on the uplink.

According to another aspect, a network node is configured to determine a number of beams to be used by a wireless device when generating a multi-beam channel state information, CSI, report. The network node includes a memory module configured to store CSI reports, a configuration module configured to determine a configuration of the wireless device to measure and report a received power for each CSI reference symbol and a beam number determiner module configured to calculate a number of beams to be used by the wireless device when generating a multi-beam CSI report based on the power reports.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
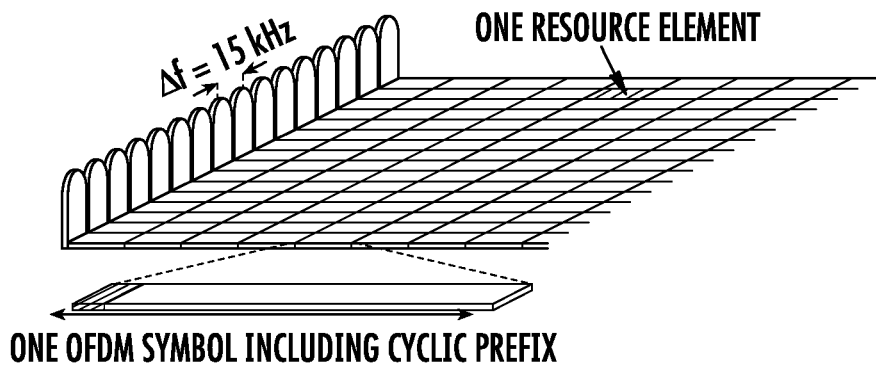
FIG. 1 is a time-frequency grid showing resource elements.
Figure 2:
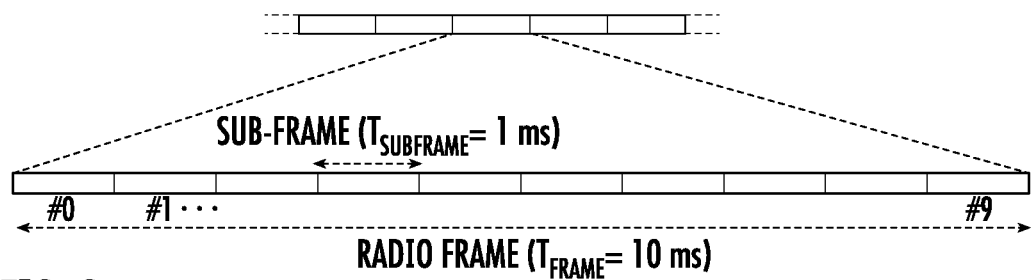
FIG. 2 is a radio frame.
Figure 3:
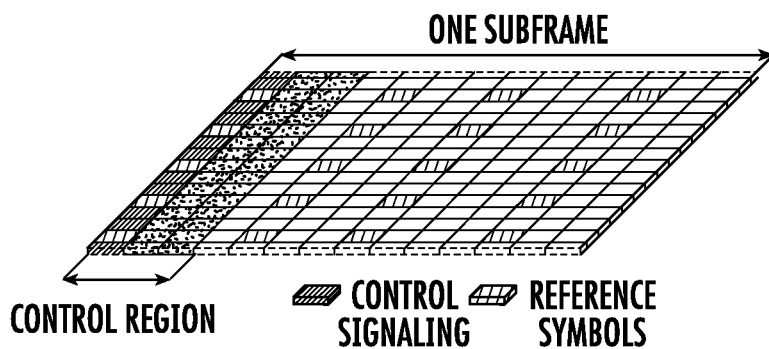
FIG. 3 is a time-frequency grid of resource elements showing 3 OFDM symbols used for control.
Figure 4:
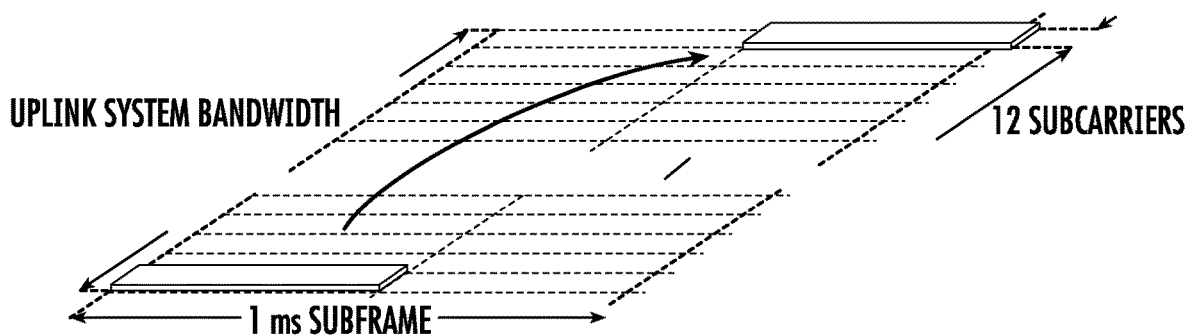
FIG. 4 is a time-frequency grid showing resource blocks assigned for uplink control on the PUCCH.
Figure 5:
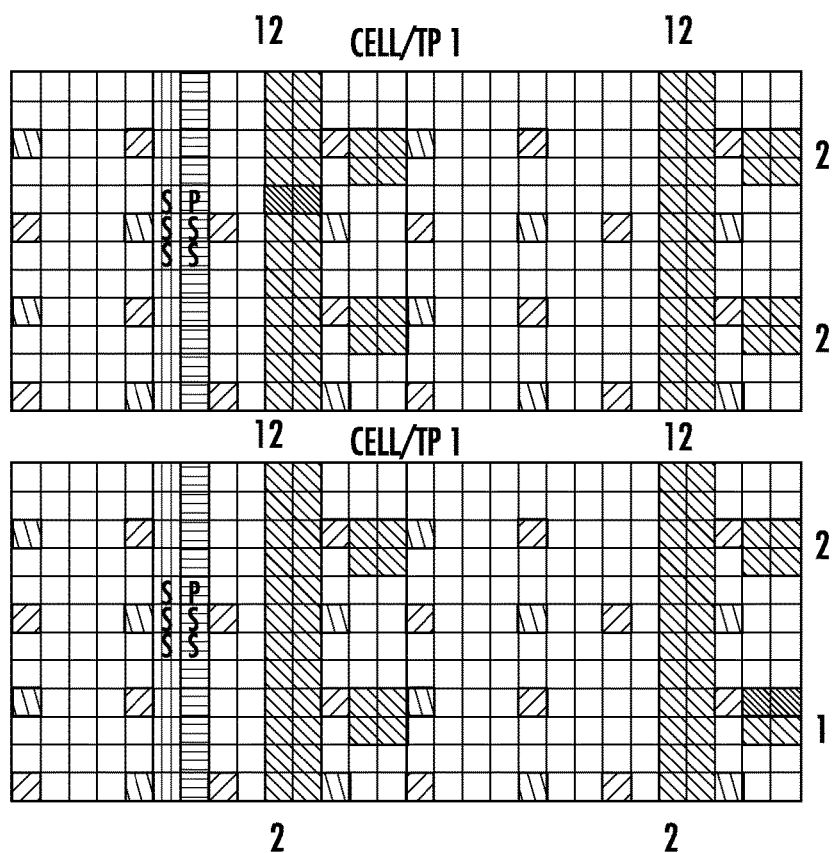
FIG. 5 is a diagram of reference signals included in a discovery reference signal occasion.
Figure 6:
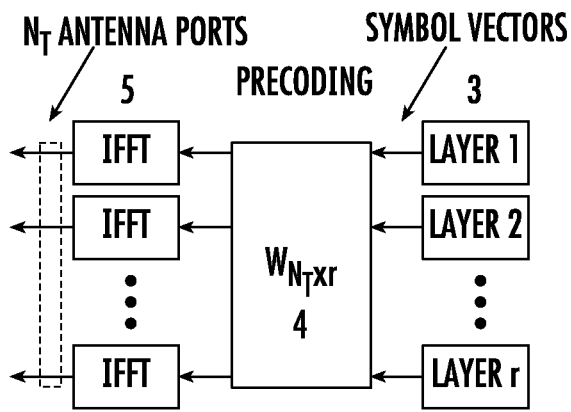
FIG. 6 is a block diagram of a spatial multiplexing operation.
Figure 7:
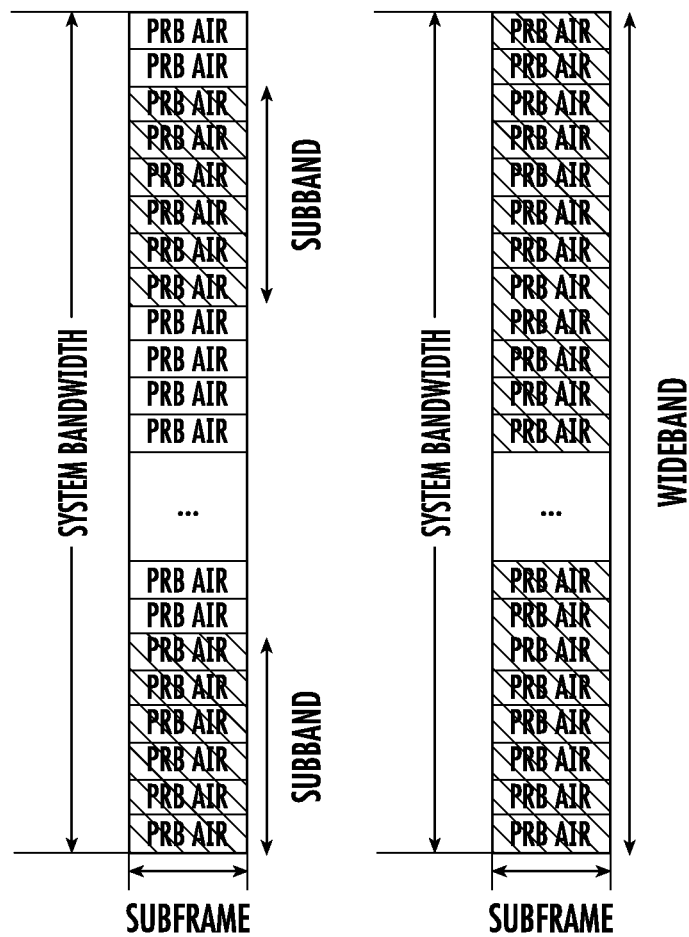
FIG. 7 illustrates differences between subband and wideband physical resource blocks (PRB)

Note that although terminology from the third generation partnership project, (3GPP) long term evolution (LTE) has been used in this disclosure to exemplify embodiments of the disclosure, this should not be seen as limiting the scope of the disclosure to only the aforementioned system. Other wireless systems, including NR (i.e., 5G), wideband code division multiple access (WCDMA), WiMax, ultra mobile broadband (UMB) and global system for mobile communications (GSM), may also benefit from exploiting the ideas covered within this disclosure.

Also note that terminology such as eNodeB (base station) and wireless device should be considered non-limiting and does in particular not imply a certain hierarchical relation between the two; in general "eNodeB" could be considered as device 1 and "wireless device" device 2, and these two devices communicate with each other over some radio channel. Herein, we also focus on wireless transmissions in the downlink, but principles disclosed herein the may be equally applicable in the uplink.

The term wireless device used herein may refer to any type of wireless device communicating with a network node and/or with another wireless device in a cellular or mobile communication system. Examples of a wireless device are user device (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "network node" used herein may refer to a radio network node or another network node, e.g., a core network node, MSC, MME, O&M, OSS, SON, positioning node (e.g. E-SMLC), MDT node, etc.

The term "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes. Remote Radio Unit (RRU) Remote Radio Head (RRH), nodes in distributed antenna system (DAS), etc.

Note further that functions described herein as being performed by a wireless device or a network node may be distributed over a plurality of wireless devices and/or network nodes.

Before describing in detail exemplary embodiments, it is noted that the embodiments reside primarily in combinations of apparatus components and processing steps related to configurable codebooks for advanced channel state information (CSI) feedback overhead reduction. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 8:
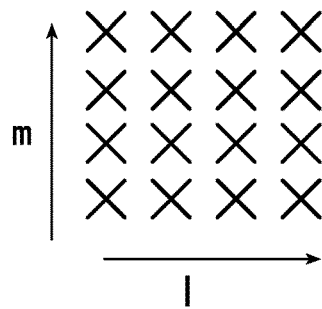
FIG. 8 is a 4×4 antenna array.

The concepts presented in this disclosure may be used with two dimensional antenna arrays and some of the presented embodiments use such antennas. Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N=N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port. An example of a 4×4 array with cross-polarized antenna elements is shown in FIG. 8, which illustrates a two-dimensional antenna array of cross-polarized antenna elements ($N_p=2$), with $N_h=4$ horizontal antenna elements, and $N_v=4$ vertical antenna elements.

Precoding may be interpreted as multiplying the signal with different beamforming weights for each antenna prior to transmission. A typical approach is to tailor the precoder to the antenna form factor, i.e. taking into account $N_h$, $N_v$ and $N_p$ when designing the precoder codebook.

In closed loop MIMO transmission schemes such as TM9 and TM10, a wireless device estimates and feeds back the downlink CSI to the base station. The base station uses the feedback CSI to transmit downlink data to the wireless device. The CSI consists of a transmission rank indicator (RI), a precoding matrix indicator (PMI) and a channel quality indicator(s) (CQI). A codebook of precoding matrices is used by the wireless device to find out the best match between the estimated downlink channel $H_n$ and a preceoding matrix in the codebook based on certain criteria, for example, the wireless device throughput. The channel $H_n$ is estimated based on a Non-Zero Power CSI reference signal (NZP CSI-RS) transmitted in the downlink for TM9 and TM10.

The CQI/RI/PMI together provide the downlink channel state to the wireless device. This is also referred to as implicit CSI feedback since the estimation of $H_n$ is not fed back directly. The CQI/RI/PMI can be wideband or subband depending on which reporting mode is configured.

The RI corresponds to a recommended number of streams that are to be spatially multiplexed and thus transmitted in parallel over the downlink channel. The PMI identifies a recommended precoding matrix codeword (in a codebook which contains precoders with the same number of rows as the number of CSI-RS ports) for the transmission, which relates to the spatial characteristics of the channel. The CQI represents a recommended transport block size (i.e., code rate) and LTE supports transmission of one or two simultaneous (on different layers) transmissions of transport blocks (i.e. separately encoded blocks of information) to a wireless device in a subframe. There is thus a relation between a CQI and an SINR of the spatial stream(s) over which the transport block or blocks are transmitted.

Codebooks of up to 16 antenna ports have been defined in LTE Up to Release 13. Both one dimension (1D) and two-dimension (2D) antenna array are supported. For LTE Release 12 wireless device and earlier, only a codebook feedback for a 1D port layout is supported, with 2, 4 or 8 antenna ports. Hence, the codebook is designed assuming these ports are arranged on a straight line in one dimension. In LTE Rel-13, codebooks for 2D port layouts were specified for the case of 8, 12, or 16 antenna ports. In addition, a codebook for 1D port layout for the case of 16 antenna ports was also specified in LTE Rel-13.

In LTE Rel-13, two types of CSI reporting were introduced, i.e. Class A and Class B. In Class A CSI reporting, a wireless device measures and reports CSI based on a new codebook for the configured 2D antenna array with 8, 12 or 16 antenna ports. The Class A codebook is defined by five parameters, i.e. ($N_1, N_2, O_1, O_2$, codebookConfig), where ($N1$, $N2$) are the number of antenna ports in a first and a second dimension, respectively, ($O_1$, $O_2$), also referred to as $Q_1$ and $Q_2$ herein, are the DFT oversampling factor for the first and the second dimension, respectively, codebookConfig ranges from 1 to 4 and defines four different ways the codebook is formed. For codebookConfig=1, a PMI corresponding to a single 2D beam is fed back for the whole system bandwidth while for codebookConfig={2,3,4}, PMIs corresponding to four 2D beams are fed back and each subband may be associated with a different 2D beam. The CSI consists of a RI, a PMI and a CQI or CQIs, similar to the CSI reporting in pre Rel-13.

In Class B CSI reporting, in one scenario (also refers to as "$K_{CSI-RS}>1$"), the eNB may pre-form multiple beams in one antenna dimension. There can be multiple ports (1, 2, 4, or 8 ports) within each beam on the other antenna dimension, "beamformed" CSI-RS are transmitted along each beam. A wireless device first selects the best beam from a group of beams configured and then measures CSI within the selected beam based on the legacy codebook for 2, 4, or 8 ports. The wireless device then reports back the selected beam index and the CSI corresponding to the selected beam. In another scenario (also refers to as "$K_{CSI-RS}=1$"), the eNB may form up to 4 (2D) beams on each polarization and "beamformed" CSI-RS is transmitted along each beam. A wireless device measures CSI on the "beamformed" CSI-RS and feedback CSI based on a new Class B codebook for 2, 4, or 8 ports.

A common type of precoding is to use a DFT-precoder, where the precoder vector used to precode a single-layer transmission using a single-polarized uniform linear array (ULA) with $N_1$ antennas is defined as $$w_{1D}(l, N_1, Q_1) = \frac{1}{\sqrt{N_1}} \begin{bmatrix} e^{j2\pi \cdot 0 \frac{l}{Q_1 N_1}} \\ e^{j2\pi \cdot 1 \frac{l}{Q_1 N_1}} \\ \vdots \\ e^{j2\pi \cdot (N_1-1) \frac{l}{Q_1 N_1}} \end{bmatrix} \quad \text{Equation 4}$$

where $l=0, 1, \ldots Q_1N_1-1$ is the precoder index and $Q_1$ is an integer oversampling factor. A precoder for a dual-polarized uniform linear array (ULA) with $N_1$ antennas for each polarization (and so $2N_1$ antennas in total) can be similarly defined as $$w_{1D,DP}(l, N_1, Q_1) = \begin{bmatrix} w_{1D}(l) \\ e^{j\phi} w_{1D}(l) \end{bmatrix} = \begin{bmatrix} w_{1D}(l) & 0 \\ 0 & w_{1D}(l) \end{bmatrix} \begin{bmatrix} 1 \\ e^{j\phi} \end{bmatrix} \quad \text{Equation 5}$$

where $e^{j\phi}$ is a cophasing factor between the two polarizations that may for instance be selected from a QPSK alphabet $$\phi \in \left\{0, \frac{\pi}{2}, \pi, \frac{3\pi}{2}\right\}.$$

Figure 9:
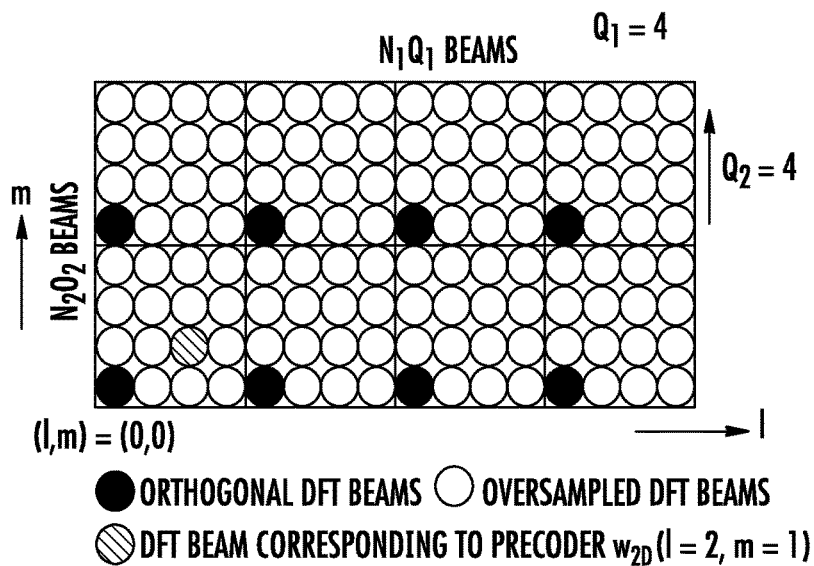
FIG. 9 is a grid of DFT beams.

A corresponding precoder vector for a two-dimensional uniform planar arrays (UPA) with $N_1 \times N_2$ antennas can be created by taking the Kronecker product of two precoder vectors as $w_{2D}(l, m) = w_{1D}(l, N_1, Q_1) \otimes w_{1D}(m, N_2, Q_2)$, where $Q_2$ is an integer oversampling factor in the $N_2$ dimension. Each precoder $w_{2D}(l, m)$ forms a DFT beam or a signal radiation pattern having its maximum power gain at a certain direction. All the precoders $\{w_{2D}(l, m), l=0, \ldots, N_1Q_1-1; m=0, \ldots, N_2Q_2-1\}$ form a grid of DFT beams. An example is shown in FIG. 9, where $(N_1, N_2)=(4,2)$ and $(Q_1, Q_2)=(4,4)$. Throughout the following sections, the terms 'DFT beams' and 'DFT precoders' are used interchangeably.

More generally, a beam with an index pair (l, m) can be identified by the direction in which the greatest energy is transmitted when precoding weights $w_{2D}(l, m)$ are used in the transmission. Also, a magnitude taper can be used with DFT beams to lower the beam's sidelobes. A 1D DFT precoder along $N_1$ and $N_2$ dimensions with magnitude tapering can be expressed as $$w_{1D}(l, N_1, Q_1, \beta) = \frac{1}{\sqrt{N_1}} \begin{bmatrix} \beta_0 e^{j2\pi \cdot 0 \frac{l}{Q_1 N_1}} \\ \beta_1 e^{j2\pi \cdot 1 \frac{l}{Q_1 N_1}} \\ \vdots \\ \beta_{N_1-1} e^{j2\pi \cdot (N_1-1) \frac{l}{Q_1 N_1}} \end{bmatrix} ; \text{ and}$$

$$w_{1D}(m, N_2, Q_2, \gamma) = \frac{1}{\sqrt{N_2}} \begin{bmatrix} \gamma_0 e^{j2\pi \cdot 0 \frac{m}{Q_2 N_2}} \\ \gamma_1 e^{j2\pi \cdot 1 \frac{m}{Q_2 N_2}} \\ \vdots \\ \gamma_{N_2-1} e^{j2\pi \cdot (N_2-1) \frac{m}{Q_2 N_2}} \end{bmatrix}$$

Where $0 < \beta_i, \gamma_k \leq 1$ ($i=0, 1, \ldots, N_1-1; k=0, 1, \ldots, N_2-1$) are amplitude scaling factors. $\beta_i=1, \gamma_k=1$ ($i=0, 1, \ldots, N_1-1; k=0, 1, \ldots, N_2-1$) correspond to no tapering. DFT beams (with or without a magnitude taper) have a linear phase shift between elements along each of the two dimensions. Without loss of generality, it can be assumed that the elements of $w(l, m)$ are ordered according to $w(l, m) = w_{1D}(l, N_1, Q_1, \beta) \otimes w_{1D}(m, N_2, Q_2, \gamma)$ such that adjacent elements correspond to adjacent antenna elements along dimension $N_2$, and elements of $w(l, m)$ spaced $N_2$ apart correspond to adjacent antenna elements along dimension $N_1$. Then the phase shift between two elements $w_{s_1}(l, m)$ and $w_{s_2}(l, m)$ of $w(l, m)$ can be expressed as:

$$w_{s_2}(l, m) = w_{s_1}(l, m) \cdot \left(\frac{\alpha_{s_2}}{\alpha_{s_1}}\right) \cdot e^{j2\pi((k_1-i_1)\Delta_1+(k_2-i_2)\Delta_2)}$$

where
- $s_1=i_1N_2+i_2$ and $s_2=k_1N_2+k_2$ (with $0 \leq i_2 < N_2$, $0 \leq i_1 < N_1$, $0 \leq k_2 < N_2$, and $0 \leq k_1 < N_1$) are integers identifying two entries of the beam $w(l, m)$ so that $(i_1, i_2)$ indicates to a first entry of beam $w(l, m)$ that is mapped to a first antenna element (or port) and $(k_1, k_2)$ indicates to a second entry of beam $w(l, m)$ that is mapped to a second antenna element (or port).
- $\alpha_{s_1}=\beta_{i_1}\gamma_{i_2}$ and $\alpha_{s_2}=\beta_{k_1}\gamma_{k_2}$ are real numbers, $\alpha_i \neq 1$ ($i=s_1, s_2$) if magnitude tapering is used; otherwise $\alpha_i=1$.

$$\Delta_1 = \frac{l}{Q_1 N_1}$$

is a phase shift corresponding to a direction along an axis, e.g. the horizontal axis ('azimuth')

$$\Delta_2 = \frac{m}{Q_2 N_2}$$

is a phase shift corresponding to direction along an axis, e.g. the vertical axis ('elevation').

Therefore, a $k^{th}$ beam $d(k)$ formed with precoder $w(l_k, m_k)$ can also be referred to by the corresponding precoder $w(l_k, m_k)$, i.e. $d(k)=w(l_k, m_k)$. Thus a beam $d(k)$ can be described as a set of complex numbers, each element of the set being characterized by at least one complex phase shift such that an element of the beam is related to any other element of the beam where $d_n(k)=d_i(k)\alpha_{i,n}e^{j2\pi(p\Delta_{1,k}+q\Delta_{2,k})}=d_i(k)\alpha_{i,n}(e^{j2\pi\Delta_{1,k}})^p (e^{j2\pi\Delta_{2,k}})^q$, where $d_i(k)$ is the $i^{th}$ element of a beam $d(k)$, $\alpha_{i,n}$ is a real number corresponding to the $i^{th}$ and $n^{th}$ elements of the beam $d(k)$; p and q are integers; and $\Delta_{1,k}$ and $\Delta_{2,k}$ are real numbers corresponding to a beam with index pair $(l_k, m_k)$ that determine the complex phase shifts $e^{j2\pi\Delta_{1,k}}$ and $e^{j2\pi\Delta_{2,k}}$ respectively. Index pair $(l_k, m_k)$ corresponds to a direction of arrival or departure of a plane wave when beam $d(k)$ is used for transmission or reception in a UPA or ULA. A beam $d(k)$ can be identified with a single index k' where $k'=l_k+N_1Q_1m_k$, i.e. along vertical or $N_2$ dimension first, or alternatively $k'=N_2Q_2l_k+m_k$, i.e. along horizontal or $N_1$ dimension first.

Figure 10:
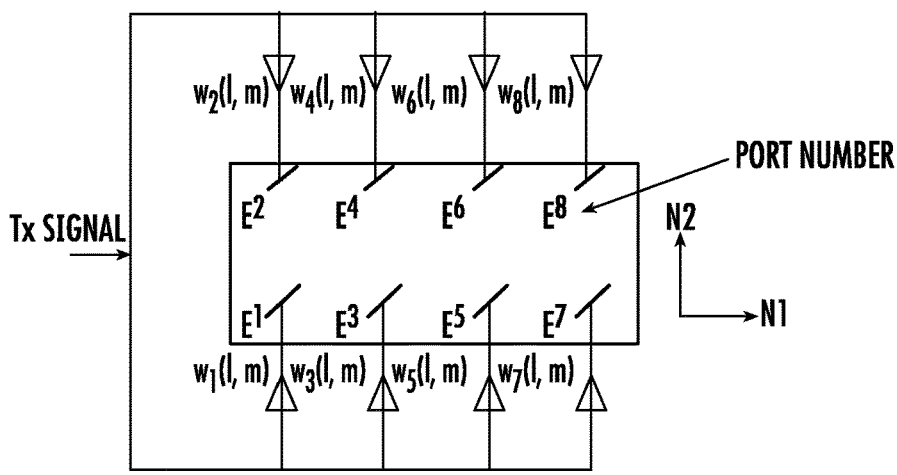
FIG. 10 is an illustration of antenna port mappings for a single polarization 2D antenna.

An example of precoder elements of a beam $w(l, m)$ to antenna ports mapping is shown in FIG. 10, where a single polarization 2D antenna with $(N_1, N_2)=(4,2)$ is illustrated. $w_i(l, m)$ is applied on the transmit (Tx) signal to port i (i=e1, e2, \ldots, e8). There is a constant phase shift between any two precoder elements associated with two adjacent antenna ports along each dimension. For example, with $\Delta_2$ defined as above, the phase shift between $w_1(l, m)$ and $w_2(l, m)$ is $e^{j2\pi\Delta_2}$, which is the same as the phase shift between $w_7(l, m)$ and $w_8(l, m)$. Similarly, with $\Delta_1$ defined as above, the phase shift between $w_2(l, m)$ and $w_4(l, m)$ is $e^{j2\pi\Delta_1}$, which is the same as the phase shift between $w_5(l, m)$ and $w_7(l, m)$.

Extending the precoder for a dual-polarized ULA may then be done as $$w_{2D,DP}(l, m, \phi) = \begin{bmatrix} 1 \\ e^{j\phi} \end{bmatrix} \otimes w_{2D}(l, m) = \quad \text{Equation 6}$$

$$\begin{bmatrix} w_{2D}(l, m) \\ e^{j\phi} w_{2D}(l, m) \end{bmatrix} = \begin{bmatrix} w_{2D}(l, m) & 0 \\ 0 & w_{2D}(l, m) \end{bmatrix} \begin{bmatrix} 1 \\ e^{j\phi} \end{bmatrix}$$

A precoder matrix $W_{2D,DP}$ for multi-layer transmission may be created by appending columns of DFT precoder vectors as $$W_{2D,DP}^{(R)} = [w_{2D,DP}(l_1, m_1, \phi_1) \ldots w_{2D,DP}(l_2, m_2, \phi_2) \ldots w_{2D,DP}(l_R, m_R, \phi_R)]$$

where R is the number of transmission layers, i.e. the transmission rank. In a special case for a rank-2 DFT precoder, $m_1 = m_2 = m$ and $l_1 = l_2 = l$, one has:

$$W_{2D,DP}^{(2)}(l, m, \phi_1, \phi_2) = [w_{2D,DP}(l, m, \phi_1) \; w_{2D,DP}(l, m, \phi_2)] = \quad \text{Equation 7}$$

$$\begin{bmatrix} w_{2D}(l, m) & 0 \\ 0 & w_{2D}(l, m) \end{bmatrix} \begin{bmatrix} 1 & 1 \\ e^{j\phi_1} & e^{j\phi_2} \end{bmatrix}$$

For each rank, all the precoder candidates form a 'precoder codebook' or a 'codebook'. A wireless device can first determine the rank of the estimated downlink wideband channel based CSI-RS. After the rank is identified, for each subband the wireless device then searches through all the precoder candidates in a codebook for the determined rank to find the best precoder for the subband. For example, in case of rank=1, the wireless device would search through $w_{2D,DP}(k, l, \phi)$ for all the possible $(k, l, \phi)$ values. In case of rank=2, the wireless device would search through $W_{2D,DP}^{(2)}(k, l, \phi_1, \phi_2)$ for all the possible $(k, l, \phi_1, \phi_2)$ values.

With multi-user MIMO, two or more wireless devices in the same cell are co-scheduled on the same time-frequency resource. That is, two or more independent data streams are transmitted to different wireless devices at the same time, and the spatial domain is used to separate the respective streams. By transmitting several streams simultaneously, the capacity of the system can be increased. This however, comes at the cost of reducing the SINR per stream, as the power has to be shared between streams and the streams will cause interference to each-other.

When increasing the antenna array size, the increased beamforming gain will lead to higher SINR, however, as the user throughput depends only logarithmically on the SINR (for large SINRs), it is instead beneficial to trade the gains in SINR for a multiplexing gain, which increases linearly with the number of multiplexed users.

Accurate CSI is required in order to perform appropriate nullforming between co-scheduled users. In the current LTE Rel. 13 standard, no special CSI mode for MU-MIMO exists and thus, MU-MIMO scheduling and precoder construction has to be based on the existing CSI reporting designed for single-user MIMO (that is, a PMI indicating a DFT-based precoder, a RI and a CQI). This may prove quite challenging for MU-MIMO, as the reported precoder only contains information about the strongest channel direction for a user and may thus not contain enough information to do proper nullforming, which may lead to a large amount of interference between co-scheduled users, reducing the benefit of MU-MIMO.

Advanced codebooks comprising precoders with multiple beams have shown to improve MU-MIMO performance due to enhanced nullforming capabilities. Codebooks and CSI feedback for multi-beam precoding have been disclosed in the literature. One such codebook is described herein.

Let $D_N$ be a size N×N DFT matrix, i.e. the elements of $D_N$ are defined as $$[D_N]_{k,l} = \frac{1}{\sqrt{N}} e^{\frac{j2\pi kl}{N}}.$$

Each column of $D_N$ can be used as a precoder for a ULA with N antennas to form a DFT beam. So the N columns of $D_N$ are associated with N orthogonal DFT beams.

These N beams can be rotated to form N new orthogonal beams pointing to slightly different directions. This can be mathematically done by multiplying $D_N$ with a rotation matrix $R_N(q)$ from the left as $$D_N(q) = R(q) D_N = [d_1, d_2, \ldots, d_N], \quad \text{Equation 8}$$

where $$R_N(q) = \text{diag}\left(\begin{bmatrix} e^{j2\pi \cdot 0 \cdot \frac{q}{N}} & e^{j2\pi \cdot 1 \cdot \frac{q}{N}} & \ldots & e^{j2\pi \cdot (N-1) \cdot \frac{q}{N}} \end{bmatrix}\right)$$

with $0 \leq q < 1$. The amount of rotation is determined by q. In Equation 8, the kth rotated DFT beam is given by $d_k$ (k=1, 2, ..., N).

The beam rotation above can also be used in the more general case of 2D UPAs with $(N_1, N_2)$ antenna ports to rotate a set of 2D DFT beams as follows:

$$D_{N_1, N_2}(q_1, q_2) = (R_{N_1}(q_1) D_{N_1}) \otimes (R_{N_2}(q_2) D_{N_2}) \quad \text{Equation 9}$$

$$= [d_1 \; d_2 \; \ldots \; d_{N_1 N_2}]$$

In Equation 9, $\{d_i\}_{i=1}^{N_1 N_2}$ are rotated 2D DFT beams and constitute an orthonormal basis of the vector space $\mathbb{C}^{N_1 N_2}$.

When dual polarizations are used in a 2D UPA, the 2D UPA can be considered as two antenna panels on top of each other, each with a different polarization. The same rotated DFT beams can be applied to both panels. A dual-polarized beam forming matrix can be defined as $$B_{N_1, N_2}(q_1, q_2) = \begin{bmatrix} D_{N_1, N_2}(q_1, q_2) & 0 \\ 0 & D_{N_1, N_2}(q_1, q_2) \end{bmatrix} = \quad \text{Equation 10}$$

$$\begin{bmatrix} d_1 & d_2 & \ldots & d_{N_1 N_2} & 0 & 0 & \ldots & 0 \\ 0 & 0 & \ldots & 0 & d_1 & d_2 & \ldots & d_{N_1 N_2} \end{bmatrix} =$$

$$[b_1 \; b_2 \; \ldots \; b_{2N_1 N_2}].$$

The columns $\{b_i\}_{i=1}^{2N_1 N_2}$ of $B_{N_1, N_2}(q_1, q_2)$ constitutes an orthonormal basis of the vector space $\mathbb{C}^{2N_1 N_2}$. Such a column $b_i$ is denoted a single-polarized beam (SP-beam) as it is constructed by a beam d transmitted on a single polarization (i.e. $b = \begin{bmatrix} d \\ 0 \end{bmatrix}$ or $b = \begin{bmatrix} 0 \\ d \end{bmatrix}$).

The optimal rank 1 precoder for a wireless device can be expressed as $$W = \sum_{k=1}^{2N_1 N_2} c_i b_i \qquad \text{Equation 11}$$

where $c_i$ is the complex coefficient associated to the $i^{th}$ beam. Under the assumption that the channel is somewhat sparse, most of the channel energy is contained in a few of the beams. So it is sufficient to describe the precoder by a few of the beams, which keeps down the feedback overhead. Assuming K SP-beams $\{b_{s_1}, b_{s_2}, \ldots, b_{s_K}\}$ are selected, where $s_k \in \{1, 2, \ldots, 2N_1 N_2\}$, then $$W = [b_{s_1} \; b_{s_2} \; \ldots \; b_{s_K}] \begin{bmatrix} c_{s_1} \\ c_{s_2} \\ \vdots \\ c_{s_K} \end{bmatrix} = \sum_{i=1}^{K} c_{s_i} b_{s_i} \qquad \text{Equation 12}$$

Generally, for the case of rank=r, we have $$W = [b_{s_1} \; b_{s_2} \; \ldots \; b_{s_K}] \begin{bmatrix} c_{s_1}^{(1)} & \ldots & c_{s_1}^{(r)} \\ c_{s_2}^{(1)} & \ldots & c_{s_2}^{(r)} \\ \vdots & \ldots & \vdots \\ c_{s_K}^{(1)} & \ldots & c_{s_K}^{(r)} \end{bmatrix} \qquad \text{Equation 13}$$

where $c_{s_i}^{(r)}$ is the coefficient corresponding to beam $b_{s_i}$ and layer r.

The precoder W in the equation above can be described for a given layer r as a linear combination of beams constructed by cophasing a $k^{th}$ beam $b_{s_k}$ with a cophasing coefficient $c_{s_i}^{(r)}$. Such a beam cophasing coefficient is a complex scalar that adjusts at least the phase of a beam relative to other beams. When a beam cophasing coefficient only adjusts relative phase, it is a unit magnitude complex number.

A more refined multi-beam precoder structure is achieved by separating the complex coefficients into a power (or amplitude) and a phase part. Letting $p_i$ and $\alpha_i^{(r)}$ respectively denote the power and phase component of $c_{s_i}^{(r)}$, the coefficient corresponding to beam $b_{s_i}$ and layer r can be given as $$c_{s_i}^{(r)} = \sqrt{p_i} e^{j\alpha_i^{(r)}}. \qquad \text{Equation 14}$$

Using Equation 14 in Equation 13, the rank r multi-beam precoder can be expressed as $$W = [b_{s_1} \; b_{s_2} \; \ldots \; b_{s_K}] \begin{bmatrix} \sqrt{p_1} & 0 & \ddots \\ 0 & \sqrt{p_2} & \\ & \ddots & \ddots & 0 \\ & & 0 & \sqrt{p_K} \end{bmatrix} \qquad \text{Equation 15}$$

$$\begin{bmatrix} e^{j\alpha_1^{(1)}} & \ldots & e^{j\alpha_1^{(r)}} \\ e^{j\alpha_2^{(1)}} & \ldots & e^{j\alpha_2^{(r)}} \\ \vdots & \ldots & \vdots \\ e^{j\alpha_K^{(1)}} & \ldots & e^{j\alpha_K^{(r)}} \end{bmatrix} = B_s \sqrt{P} \begin{bmatrix} e^{j\alpha_1^{(1)}} & \ldots & e^{j\alpha_1^{(r)}} \\ e^{j\alpha_2^{(1)}} & \ldots & e^{j\alpha_2^{(r)}} \\ \vdots & \ldots & \vdots \\ e^{j\alpha_K^{(1)}} & \ldots & e^{j\alpha_K^{(r)}} \end{bmatrix}$$

wherein $$B_s = [b_{s_1} \; b_{s_2} \; \ldots \; b_{s_K}] \qquad \text{Equation 16}$$

and $$\sqrt{P} = \begin{bmatrix} \sqrt{p_1} & 0 & \ddots \\ 0 & \sqrt{p_2} & \\ & \ddots & \ddots & 0 \\ & & 0 & \sqrt{p_K} \end{bmatrix}. \qquad \text{Equation 17}$$

Note that $B_s$ in Equation 16 contains the K SP-beams chosen from the matrix $B_{N_1,N_2}(q_1, q_2)$ in Equation 10. Now, letting $$W_1 = B_s \sqrt{P} \qquad \text{Equation 18}$$

and further letting $$W_2 = \begin{bmatrix} e^{j\alpha_1^{(1)}} & \ldots & e^{j\alpha_1^{(r)}} \\ e^{j\alpha_2^{(1)}} & \ldots & e^{j\alpha_2^{(r)}} \\ \vdots & \ldots & \vdots \\ e^{j\alpha_K^{(1)}} & \ldots & e^{j\alpha_K^{(r)}} \end{bmatrix}, \qquad \text{Equation 19}$$

the multi-beam precoder of Equation 15 can be alternatively expressed as $$W = W_1 W_2. \qquad \text{Equation 20}$$

The selection of $W_1$ may then be made on a wideband basis while the selection of $W_2$ may be made on a subband basis. The precoder vector for $l^{th}$ subband may be expressed as $$W_l = W_1 W_2(l). \qquad \text{Equation 21}$$

That is, only $W_2$ is a function of the subband index l and the same $W_1$ applies to all subbands (i.e., $W_1$ is selected on a wideband basis).

As multiplying the precoder vector W with a complex constant C does not change its beamforming properties (as only the phase and amplitude relative to the other single-polarized beams is of importance), one may without loss of generality assume that the coefficients corresponding to e.g. SP-beam 1 is fixed to $p_1 = 1$ and $e^{j\alpha_1} = 1$, so that parameters for one less beam needs to be signaled from the wireless device to the base station. Furthermore, the precoder may be further assumed to be multiplied with a normalization factor, so that e.g. a sum power constraint is fulfilled, i.e. that $\|w\|^2 = 1$.

In some cases, the possible choices of columns of $B_{N_1,N_2}(q_1, q_2)$ in Equation 10 are restricted so that if column $i = i_0$ is chosen, so is column $i = i_0 + N_1 N_2$. That is, if an SP-beam corresponding to a certain beam mapped to the first polarization is chosen, e.g.

$$b_{i_0} = \begin{bmatrix} d_{i_0} \\ 0 \end{bmatrix},$$

this would imply that the SP-beam $$b_{i_0+N_1N_2} = \begin{bmatrix} 0 \\ d_{i_0} \end{bmatrix}$$

is chosen as well. That is, the SP-beam corresponding to the said certain beam mapped to the second polarization is chosen as well. This would reduce the feedback overhead as only $K_{DP}=K/2$ columns of $B_{N_1,N_2}(q_1, q_2)$ would have to be selected and signaled back to the base station. In other words, the column selection is done on a dual-polarized beam (or DP-beam) level rather than an SP-beam level. If a certain beam is strong on one of the polarizations it would typically imply that the beam would be strong on the other polarization as well, at least in a wideband sense, so the loss of restricting the column selection in this way would not significantly decrease the performance.

What needs to be fed back by the wireless device to the base station is thus:

The chosen columns of B,
- if K single polarized (SP) beams $(b_{s_1}, b_{s_2}, \ldots, b_{s_K})$, are chosen from $B_{N_1,N_2}(q_1, q_2)$ to form the columns of B, then this requires at most $K \cdot \log_2(2N_1N_2)$ bits.
- If $K_{DP}$ dual polarized (DP) beams are chosen from $B_{N_1,N_2}(q_1, q_2)$ to form the columns of $B_s$, then this requires at most $K_{DP} \cdot \log_2(N_1N_2)$ bits.

The DFT basis rotation factors $q_1$ and $q_2$ in the first and second dimensions, respectively.
For instance, the $$q_j(i) = \frac{i}{Q},$$

$i=0, 1, \ldots, Q-1, j \in \{1,2\}$, for some value of Q. The corresponding overhead would then be $2 \cdot \log_2 Q$ bits.

The (relative) power levels associated with the chosen beams
- If K SP-beams are chosen from $B_{N_1,N_2}(q_1, q_2)$ to form columns of $B_s$, the wireless device needs to feed back the relative power levels $\{p_2, p_3, \ldots, p_K\}$ corresponding to the SP-beams. If L is the number of possible discrete power levels, $(K-1) \cdot \log_2 L$ bits are needed to feed back the SP-beam power levels.
- If $K_{DP}$ DP-beams are chosen, the wireless device needs to feed back the relative power levels $\{p_2, p_3, \ldots, p_{K_{DP}}\}$ corresponding to the DP-beams. If L the number of possible discrete power levels, $(K_{DP}-1) \cdot \log_2 L$ bits are needed to feed back the DP-beam power levels.

The cophasing factors
- If K SP beams are chosen from $B_{N_1,N_2}(q_1, q_2)$ to form columns of $B_s$, the cophasing factors $\{e^{j\alpha_2}, e^{j\alpha_3}, \ldots, e^{j\alpha_K}\}$ of the SP-beams need to be fed back by the wireless device to the base station. For instance, $$\alpha_k(m) = \frac{2\pi k}{M},$$

$m=0, 1, \ldots M-1, k \in \{2, 3, \ldots, K\}$, for some value of M. The corresponding overhead would be $(K-1) \cdot \log_2 M$ bits per rank.
- If $K_{DP}$ DP beams are chosen from $B_{N_1,N_2}(q_1, q_2)$ to form columns of $B_s$, the cophasing factors $\{e^{j\alpha_2}, e^{j\alpha_3}, \ldots, e^{j\alpha_{2K_{DP}}}\}$ need to be fed back by the wireless device to the base station. For instance, $$\alpha_k(m) = \frac{2\pi k}{M},$$

$m=0, 1, \ldots M-1, k \in \{2, 3, \ldots, 2K_{DP}\}$, for some value of M. The corresponding overhead would be $(2K_{DP}-1) \cdot \log_2 M$ bits per rank.

Consider an example codebook with $K_{DP}=3$ dual polarized beams, $N_1=4$ antenna ports in the first dimension and $N_2=4$ antenna ports in the second dimension, and an oversampling factor of Q=4 in both dimensions. Furthermore, the number of possible beam power levels is assumed to be L=4, the number of levels associated with cophasing factors is M=8, and a system with 10 MHz carrier bandwidth and $N_{sub}=9$ subbands is assumed. The beam identification, rotation, and relative powers are assumed to be reported once, when they identify $W_1$. On the other hand, the cophasing factors identify $W_2(l)$ and are reported once per subband. This means that a total of $N_{sub}(2K_{DP}-1) \cdot \log_2 M$ bits are needed to feedback the cophasing factors.

Then, the number of bits to report the following components of the CSI are given as follows:

For $W_1$: a total of 20 bits is needed:
  beam identification: $3 \cdot \log_2(4 \cdot 4) = 12$ bits
  beam rotation: $2 \cdot \log_2(4) = 4$ bits
  beam relative power: $(3-1) \cdot \log_2(4) = 4$ bits For $W_2$: cophasing: $9 \cdot (2 \cdot 3-1) \cdot \log_2(8) = 135$ bits are needed It can be observed that the vast majority of CSI feedback (87% in this example) is for cophasing information. Furthermore, a total of 155 bits is needed for a single cell. If the wireless device is configured for downlink carrier aggregation with, for example, 5 cells, then 5*155=775 bits are needed.

In some embodiments, the uplink feedback overhead associated with the multi-beam precoder codebook is reduced. Such embodiments include:
- The configuration of one or more power threshold parameters to the wireless device by the base station that the wireless device uses in determining the number of beams to be included in the multi-beam precoder codebook.
- The determination of the number of beams included in the multi-beam precoder codebook by the wireless device and the subsequent reporting of this information to the base station to aid the base station in determining the UL control information payload size on the UL shared channel.
- Various methods where the determination of the number of beams included in the multi-beam precoder codebook is performed by the base station.
- A method for further reducing uplink feedback overhead for wireless device selected subband feedback mode where the number of subbands to be fed back is a function of both system bandwidth and the number of beams included in the multi-beam precoder codebook.

Since different wireless devices may experience different channels with the channel energy contained in different number of beams, using the embodiments disclosed herein, the UCI overhead can be controlled to suit the needs of different wireless devices.

As described earlier, the majority of the feedback overhead associated with multi-beam precoder codebooks is incurred in feeding back the cophasing information. When $K_{DP}$ dual polarized beams are chosen from $B_{N_1,N_2}(q_1, q_2)$ to form columns of $B_s$, the overhead incurred in feeding back the cophasing factors is $N_{sub}(2K_{DP}-1)\cdot\log_2 M$ bits. Similarly, when K single polarized beams are chosen from $B_{N_1,N_2}(q_1, q_2)$ to form columns of $B_s$, the overhead incurred in feeding back the cophasing factors is $N_{sub}(K-1)\cdot\log_2 M$ bits. Hence, from an UL overhead reduction perspective, it is beneficial to control the number of beams included in $B_s$ (That is, to limit the value of $K_{DP}$ in the case of dual polarized beams or to limit the value of K in the case of single polarized beams).

In one embodiment, the base station, e.g., eNodeB (eNB), may configure a wireless device with a power threshold parameter $P_{TH}$. During beam identification, the wireless device only includes the beams that have an associated power component exceeding the configured threshold. In the case of single polarized beams, when the wireless device is selecting a finite set of beams $\{b_{s_1}, b_{s_2}, \ldots, b_{s_K}\}$ from the full set of beams in $B_{N_1,N_2}(q_1, q_2)$, the wireless device only selects the beams that satisfy the constraint $$p_i > P_{TH}, \quad\quad\quad \text{Equation 22}$$

where $p_i$ is the power component corresponding to beam $b_{s_i}$ as per the definition in Equation 14.

In some embodiments, an alternative constraint of $$p_i \geq P_{TH}, \quad\quad\quad \text{Equation 23}$$

may also be used in place of the constraint in Equation 22. The constraint in Equation 23 means that the wireless device picks beam $b_{s_i}$ if its associated power component is greater than or equal to the power threshold parameter configured to a wireless device. Similarly, in the case of dual polarized beams, when the wireless device is selecting a finite set of beams $$\{b_{s_1}, b_{s_2}, \ldots, b_{s_{K_{DP}}}\}$$

from the full set of beams in $B_{N_1,N_2}(q_1, q_2)$, the wireless device may use either Equation 22 or Equation 23 as the criterion for selecting beam $b_{s_i}$. Hence, only the phase and power components of the beams included in the matrix B, (as defined in Equation 16 for example) need to be fed back by the wireless device to the base station. The power threshold parameter $P_{TH}$ may be semi-statically configured to the wireless device by the base station via radio resource control (RRC) signaling. The power threshold parameter $P_{TH}$ can either be cell, transmission point, or wireless device specific. When cell or transmission point specific, $P_{TH}$ may be associated with an identifier of an NZP CSI-RS, such as csi-RS-ConfigNZPId-r11 from 3GPP TS 36.331, the identified NZP CSI-RS is used to determine the multi-beam CSI feedback. When wireless device specific, $P_{TH}$ may not be associated with a single NZP CSI-RS identifier for a given CSI process, it may instead be associated with a plurality of NZP CSI-RSs for one or multiple CSI process(es).

In some embodiments, the semi-statically configured $P_{TH}$ parameter may represent a power ratio (i.e., $0<P_{TH}<1$) with respect to the beam with the maximum received power.

In an alternative embodiment, multiple power threshold parameters $\{P_{TH}^{(1)} P_{TH}^{(2)} \ldots P_{TH}^{(R)}\}$ may be configured by the base station to the wireless device, where $P_{TH}^{(r)}$ is the power threshold parameter associated with rank r and R denotes the maximum transmission rank. In this scenario, for a given transmission rank r, the wireless device may select beam $b_{s_i}$ if its associated power component $p_i$ satisfies one of the following constraints $$p_i > P_{TH}^{(r)}, \quad\quad\quad \text{Equation 24}$$

$$p_i \geq P_{TH}^{(r)}. \quad\quad\quad \text{Equation 25}$$

Equation 24-Equation 25 imply that beam $b_{s_i}$ is only selected for rank r transmission if its associated power component $p_i$ exceeds (or in the case of Equation 25 greater than or equal to) the rank specific power threshold parameter $P_{TH}^{(r)}$.

One of the applications for multi-beam precoder is MU-MIMO transmission to two or more wireless devices in a cell. This is generally good for wireless devices with good channel qualities, i.e. high SINRs. For wireless devices at the cell edge, their SINRs are generally poor and are not good for MU-MIMO transmissions. Therefore, in another embodiment, a SINR threshold may be used by a wireless device to determine whether a single beam or multiple beams will be used in the multi-beam precoder. A wireless device may compare its wideband SINR with the SINR threshold and if the wideband SINR is below the SINR threshold, a single beam would be used. Otherwise, multiple beams would be used. In case of multiple beams, the exact number of beams can be determined by methods discussed in the previous embodiments. The SINR threshold can be determined by the base station and signaled to the wireless device. One suitable wideband SINR measure is RSRQ, as defined in 3GPP TS 36.214. Alternatively, the wireless device may calculate a wideband CQI assuming a single beam is used with the multi-beam codebook. The wideband SINR is then the spectral efficiency corresponding to the calculated CQI.

LTE CSI feedback in Rel-13 has a payload size on PUSCH or PUCCH that is known beforehand to the base station, e.g., eNodeB (eNB). Furthermore, the base station is also aware of which REs are occupied by PUSCH or by UCI on PUSCH (that is, the UCI resource on PUSCH is known to the base station). The payload size is set by parameters signaled in RRC and/or DCI. Therefore, if the UCI payload size varies according to a parameter not known by the base station, the base station may not be able to decode the UCI or a PUSCH that carries the UCI. In the above embodiment(s), whether or not a beam is included in the advanced codebook with multi-beam precoder is determined by the power threshold parameter(s). As a result, the number of beams included in the multi-beam precoder can vary depending on the channel experienced by a given wireless device and the value of the power threshold parameter configured to the wireless device. Hence, the UCI payload size, which is determined by the feedback overhead, will be varying as a function of the number of beams included in the multi-beam precoder.

Therefore, in some embodiments, the wireless device indicates the number of beams in a multi-beam PMI report in higher layer signaling. Because higher layer messages can be variably sized, base station will be able to decode messages containing multi-beam reports whose size varies. The multi-beam PMI report may be carried in a MAC control element, an RRC message such as a measurement report, or another suitable higher layer message.

In another embodiment, a two-step approach is taken. In the first step, the number of beams included in the multi-beam precoder is first indicated to the base station by the wireless device via a MAC control element. Once the base station receives this MAC control element message, the base station will know the number of beams included and will know the UCI payload. Then, in the second step, the different components of the CSI including rank indicator, PMI associated with the multi-beam precoder codebook (i.e., $W_1$ and $W_2$), and CQI will be reported by the wireless device over PUSCH. Since the base station knows the UCI payload from the first step, the base station will know the resource elements containing UCI in the PUSCH transmission that contains the CSI report.

In another embodiment, the base station may additionally signal semi-statically the maximum number of beams to be included in the multi-beam precoder codebook. The base station may send the maximum number of beams as part of RRC signaling. The maximum number of beams can either be a cell specific or a wireless device specific parameter. The actual number of beams selected by the wireless device to be included in the multi-beam precoder codebook based on $P_{TH}$ can be reported periodically over PUCCH. For example, if the maximum number of beams is configured to be 4, then 2 bits may be used by the wireless device to periodically indicate to the base station the actual number of selected beams using PUCCH. For instance, the subframe in which the actual number of beams included in the multi-beam precoder codebook may be periodically indicated in the subframes satisfying the condition $$(10 \times n_f + \lfloor n_s/2 \rfloor - N_{OFFSETCQI} - N_{OFFSETRI}) \bmod (N_{pd} \cdot M_{RI} \cdot M_{beams}) = 0. \quad \text{Equation 26}$$

where $M_{beams}$ is a periodicity multiple in subframes that is a new higher layer parameter configured to the wireless device by the base station via higher layer signaling. This higher layer parameter is to be used to determine in which subframes the wireless device should report the actual number of beams included in the multi-beam precoder codebook over PUCCH. The remaining parameters in Equation 26 are defined as before. Furthermore, a new reporting type (as an extension to the ones described above) may be added to support reporting the actual number of beams included in the multi-beam precoder codebook on PUCCH. Once the wireless device feeds back the actual number of beams included in the multi-beam precoder codebook, the base station has knowledge of the UCI payload size for CSI feedback over PUSCH. Hence, the base station can allocate the appropriate amount of resources to the wireless device for CSI feedback over PUSCH.

In yet another embodiment, the base station may firstly request the wireless device to report the actual number of beams included in the multi-beam precoder codebook on PUSCH. Then, after knowing the number of beams included in the multi-beam precoder codebook, the base station sends a CSI request to ask the wireless device to feedback the different components of the CSI including rank indicator, PMI associated with the multi-beam precoder codebook (i.e., $W_1$ and $W_2$), and CQI in a PUSCH report.

In a further embodiment, the wireless device reports the number of beams included in the multi-beam precoder codebook on PUSCH in the same report (i.e., in the same subframe) along with other CSI components such as rank indicator, PMI associated with the multi-beam precoder codebook (i.e., $W_1$ and $W_2$), and CQI. The number of feedback bits for the PMI associated with the multi-beam precoder codebook (i.e., $W_1$ and $W_2$) are not known to the base station at this point. If the resource location of the number of beams included in the multi-beam precoder codebook within the PUSCH resource is known to the base station, the base station may first decode the number of beams included in the multi-beam precoder codebook. Once this is decoded, the base station will know the UCI payload of the CSI report and hence will know the UCI rate matching on the PUSCH transmission that contains the CSI report.

In another embodiment, the base station transmits N non-precoded CSI-RS ports with periodicity P, and the wireless device measures the P port CSI-RS and determines the number of dominant beams and their associated beam powers. In some embodiments, the wireless device only considers the orthogonal beams when determining the number of dominant beams and their associated powers. The wireless device will periodically report the number of dominant beams and/or the powers associated with the beams after quantization. The base station uses this information to determine the number of beams suitable for each wireless device.

In one embodiment, the wireless device measures multiple beams using discovery reference signals (DRSs) and reports the received power strengths on these beams. Using these measurement reports, the base station determines an appropriate number of dominant or significant beams that should be included in the multi-beam precoder codebook. In a detailed embodiment, the base station transmits distinct CSI-RSs in a DRS occasion over orthogonal beams, such as where the CSI-RSs are precoded on an $N_1 N_2$ element array using beams $d_i$ from Equation 9, and the wireless device measures and reports received power for each of the CSI-RSs. From the reported power values, the base station determines the number of beams a given wireless device should include in the multi-beam precoder codebook.

In an alternative embodiment, the wireless device transmits reference signals on the uplink for the purposes of channel sounding. The base station can use these sounding reference signals to estimate the channel H on the uplink. The base station can then multiply to estimated channel matrix $\hat{H}$ by the $B_{N_1,N_2}(q_1, q_2)$ matrix of Equation 10 for different rotation parameter combinations $(q_1, q_2)$. The power associated with each column of the matrix $\hat{H}B_{N_1,N_2}(q_1, q_2)$ then represents the power associated with the $N_1 N_2$ orthogonal beams. By comparing the power of the orthogonal beams to a predetermined threshold, the base station can determine the number of beams that should be included in the multi-beam precoder codebook.

Alternatively, to determine the number of beams to be included in the multi-beam precoder, the base station can configure the wireless device with $K_{CSI-RS}>1$ Class B CSI-RS resources and transmit each CSI-RS port of a given CSI-RS resource using one of $K_{CSI-RS}$ orthogonal beams. The $K_{CSI-RS}$ orthogonal beams can be beams $d_i$ from Equation 9.

In one embodiment, the wireless device determines the power of each of the $K_{CSI-RI}$ CSI-RS resources as the average power over all CSI-RS ports in the resource. The wireless device then reports the power values for all $K_{CSI-RS}$ resources. In an alternative embodiment, the wireless device reports power values for the K' strongest CSI-RS resources where K' is configured to each wireless device by the base station. The parameter K' may be RRC signaled to the wireless device and can either be wireless device specific or cell specific. Using the reported power values corresponding to the $K_{CSI-RS}$ (or K') resources (where each corresponds to an orthogonal beam), the base station determines the number of beams to be included in the multi-beam precoder codebook.

In one embodiment, the number of beams to be included in the multi-beam precoder codebook is signaled to the wireless device by the eNB. In one case, the number of beams to be included in the multi-beam precoder codebook is signaled to the wireless device by the base station via higher layer signaling such as RRC or a MAC control element. In an alternate case, the base station signals the number of beams to be included in the multi-beam precoder codebook dynamically via DCI to the wireless device. Depending on the number of beams signaled, the base station is aware of the payload size of CSI to be sent by the wireless device on the UL-SCH.

The majority of the feedback overhead associated with multi-beam precoder codebook is incurred in feeding back the cophasing information. When $K_{DP}$ dual polarized beams are chosen from $B_{N_1,N_2}(q_1, q_2)$ to form columns of $B_s$, the overhead incurred in feeding back the cophasing factors is $N_{sub}(2K_{DP}-1)\cdot\log_2 M$ bits. Similarly, when K single polarized beams are chosen from $B_{N_1,N_2}(q_1, q_2)$ to form columns of $B_s$, the overhead incurred in feeding back the cophasing factors is $N_{sub}(K-1)\cdot\log_2 M$ bits. Hence, the number of subbands $N_{sub}$ can also significantly affect the UL overhead. As described previously. LTE supports both higher layer configured subband feedback and wireless device selected subband feedback.

In this embodiment, the UL feedback overhead is further reduced for a wireless device selected subband feedback mode by making the number of subbands to be fed back a function of both system bandwidth and the number of beams to be included in the multi-beam precoder codebook. For instance, for a given system bandwidth, the number of subbands can be reduced when the number of beams to be included in the multi-beam precoder codebook is increased. An example for this embodiment is shown in Table 6.

In another embodiment, the subband size is varied as a function of the number of beams to be included in the multi-beam precoder codebook. For instance, with increasing number of beams to be included in the multi-beam precoder codebook, the subband size is increased. Similarly, with smaller number of beams to be included in the multi-beam precoder codebook, the subband size will be lower. In some variants of this embodiment, both the subband size and the number of subbands are functions of the number of the beams to be included in the multi-beam precoder codebook.

TABLE 6

| System Bandwidth $N_{RB}^{DL}$ | Subband Size k (RBs) | Number of Beams in multi-beam precoder codebook | Number of Subbands |
| --- | --- | --- | --- |
| 6-7 | NA | NA | NA |
| 8-10 | 2 | 1 | 1 |
|  |  | 2 | 1 |
|  |  | 3 | 1 |
| 11-26 | 2 | 1 | 3 |
|  |  | 2 | 2 |
|  |  | 3 | 2 |
| 27-63 | 3 | 1 | 5 |
|  |  | 2 | 3 |
|  |  | 3 | 2 |
| 64-110 | 4 | 1 | 6 |
|  |  | 2 | 3 |
|  |  | 3 | 2 |

Recall the example discussed above where an example multi-beam precoder codebook was considered with $K_{DP}=3$ dual polarized beams. $N_1=4$ antenna ports in the first dimension and $N_2=4$ antenna ports in the second dimension, and an oversampling factor of Q=4 in both dimensions. Also note that the number of possible beam power levels was assumed to be L=4, the number of levels associated with cophasing factors was M=8, and a system with 10 MHz carrier bandwidth and $N_{sub}=9$ subbands was assumed. For this example, a total of 155 bits were needed for a single cell.

Now, consider the case where the number of dual polarized beams can be reduced to $K_{DP}=2$ by utilizing one or more of the embodiments described above. Then, the number of bits to report the following components of the CSI in the case of $K_{DP}=2$ are given as follows:

For $W_1$: a total of 14 bits is needed:
beam identification: $2\cdot\log_2(4\cdot4)=8$ bits
beam rotation: $2\cdot\log_2(4)=4$ bits
beam relative power: $(2-1)\cdot\log_2(4)=2$ bits
For $W_2$: cophasing: $9\cdot(2\cdot2-1)\cdot\log_2(8)=81$ bits are needed.

Hence, a total of 95 bits are needed to feedback CSI for the case of $K_{DP}=2$. This yields a significant reduction (i.e., 39% reduction) in feedback overhead when compared to the overhead required for the case of $K_{DP}=3$.

Since different wireless devices may experience different channels with the channel energy contained in different number of beams, using the above embodiments the UCI overhead can be controlled to suit the needs of different wireless devices. For instance, a wireless device that experiences a channel with channel energy contained in 2 beams can use an appropriate number of feedback bits (95 bits, in the above example) when compared to the case where the wireless device has to assume that a fixed number of beams will be included in the multi-beam precoder codebook.

Thus, embodiments include a first embodiment wherein a network node configures the wireless device with one or multiple power threshold parameters that the wireless device uses in determining the number of beams to be included in the multi-beam precoder codebook. One or more of the following may also be included:

The wireless device only includes beams that have a power component exceeding the threshold in the multi-beam precoder codebook;

The power threshold parameters(s) are signaled via RRC and can be associated with an NZP CSI-RS identifier;

The power threshold parameter(s) can also represent a power ratio with respect to the beam with the maximum received power;

Different power threshold parameters can be applied to different transmission ranks (see Equation 24-Equation 25);

In addition, the base station may configure a SINR threshold to the wireless device for the wireless device to determine whether a single beam precoder or a multiple beam precoder should be used.

In a second embodiment, the wireless device indicates the number of beams included in the multi-beam precoder codebook to the base station to aid the base station in determining the UL control information payload size on the UL shared channel. One or more of the following may also be included:

The indication involves a two-step approach where the wireless device indicates the number of beams included in an MAC control element in a first step and then sends the other components of CSI on PUSCH in a second step;

The wireless device sends the number of beams included in a periodic report on PUCCH and the remaining components of CSI in a different report on PUSCH;

The base station semi-statically configures the wireless device with a higher layer parameter used to determine in which subframes the wireless device should report the actual number of beams included in the multi-beam precoder codebook over PUCCH (see Equation 26);

The wireless device sends the number of beams included in an aperiodic report on PUSCH and the remaining components of CSI in a different report on PUSCH;

The base station will be triggering these reports;

The indication of such number of beams along with other components of the CSI report is done via higher layer signaling such as MAC control elements or RRC signaling;

The wireless device sends the number of beams included in the same PUSCH report as other CSI components;

The base station first decodes the number of beams included and then determines the UCI payload size information for the PUSCH report;

The wireless device measures a non-precoded P-port CSI-RS and determines the dominant beams and their associated power and reports this information to the base station;

The base station semi-statically configures the maximum number of beams to be included in the multi-beam precoder codebook.

In a third embodiment, the base station determines the number of beams to be used by the wireless device when calculating multi-beam CSI using one of the following:

The base station transmits orthogonal beams over CSI-RSs in a DRS occasion and configures the wireless device to measure and report the received power for each of the CSI-RSs. The base station determines the number of beams to be used by the wireless device when calculating multi-beam CSI from these power reports;

The base station determines the number of beams to be used by the wireless device when calculating multi-beam CSI by using measurements on the sounding reference signals transmitted by the wireless device on the uplink;

The base station configures the wireless device to receive $K_{CSI-RS}$ CSI-RS resources. The base station then transmits all CSI-RS ports of each CSI-RS resource using one beam. The beam is one of $K_{CSI-RS}$ orthogonal beams, and so each CSI-RS resource is beamformed with one of $K_{CSI-RS}$ orthogonal beams. The wireless device reports the average power across all antenna ports for a given CSI-RS resource. The wireless device reports the average power for up to K' of the CSI-RS resources. The eNB then determines the number of beams to be used by the wireless device when calculating multi-beam precoder codebook using the power values;

The number of beams to be used by the wireless device when calculating multi-beam CSI is signaled by the base station to the wireless device via RRC signaling, a MAC control element, or DCI.

A fourth embodiment is a method for further reducing uplink feedback overhead for wireless device selected subband feedback mode where the number of subbands to be fed back is a function of both system bandwidth and the number of beams included in the multi-beam precoder codebook. According to another aspect a method where the subband size is varied as a function of the number of beams to be included in the multi-beam precoder codebook is provided.

Figure 11:
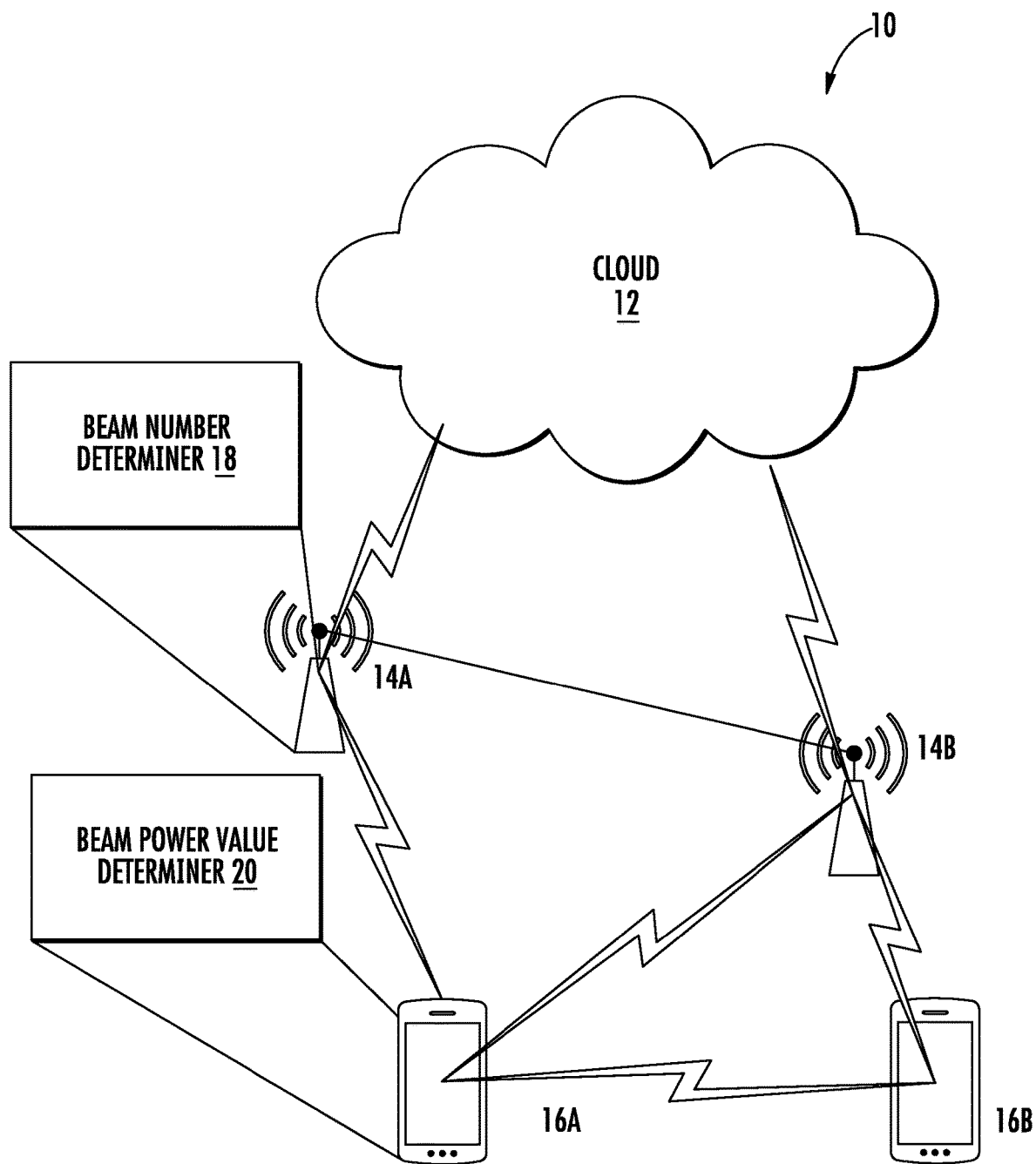
FIG. 11 is a block diagram of a network node.

FIG. 11 is a block diagram of a wireless communication network configured according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

The term "wireless device" or mobile terminal used herein may refer to any type of wireless device communicating with a network node 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 14, it is understood that the functions can be performed in other network nodes and elements. It is also understood that the functions of the network node 14 can be distributed across network cloud 12 so that other nodes can perform one or more functions or even parts of functions described herein. Also, functions described herein as being performed by a network node 14 may also be performed by a wireless device 16.

The network node 14 has a beam number determiner 18 configured to determine a number of beams to be included in a multi-beam precoder codebook. The wireless device 16 includes a beam power value determiner 20 to determine a power value for each beam to be included in a precoder codebook based on the received power threshold parameter.

Figure 12:
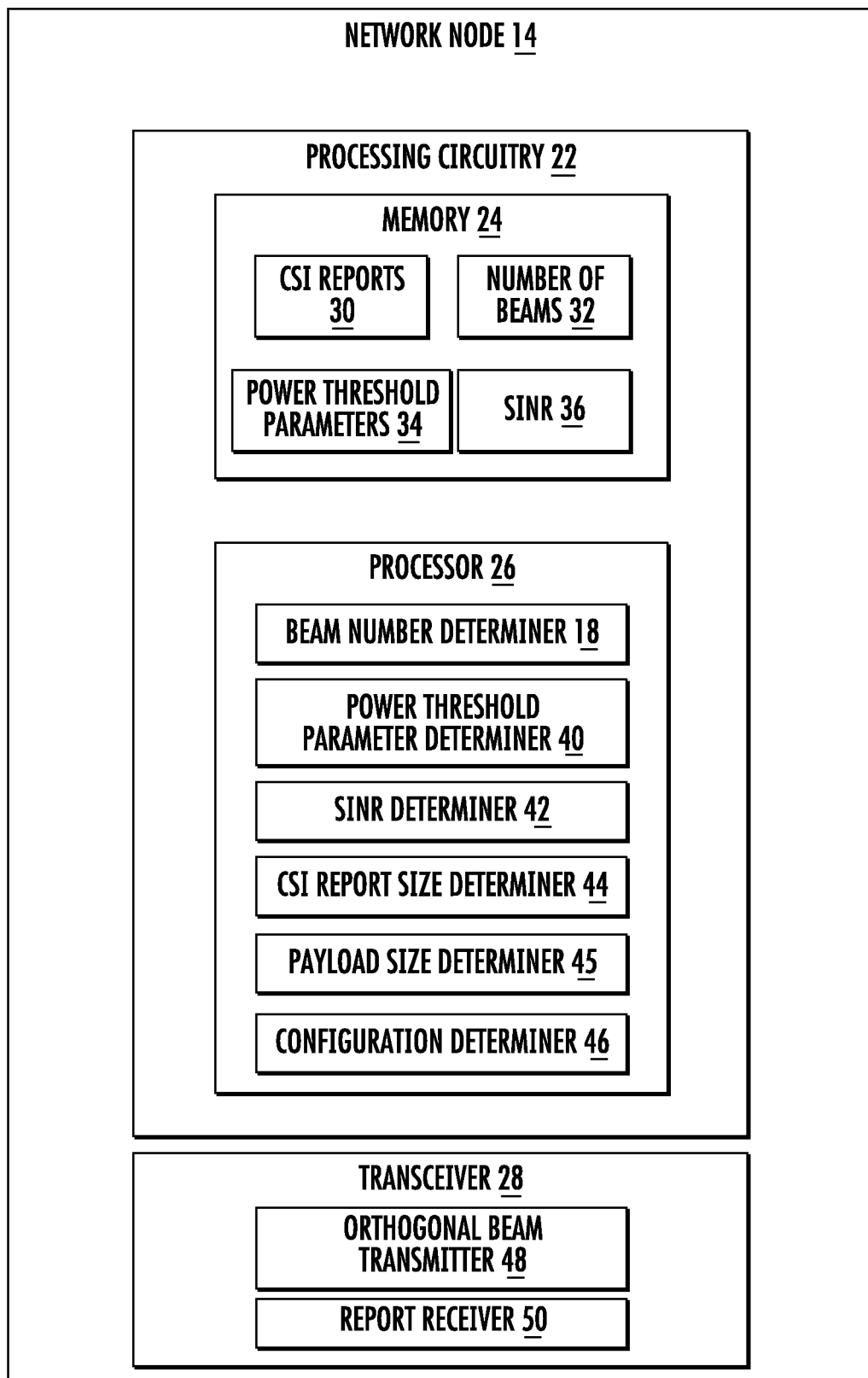
FIG. 12 is a block diagram of an alternative embodiment of a network node.

FIG. 12 is a block diagram of a network node 14 configured to configure a wireless device and to determine a number of beams to include in a multi-beam precoder codebook by a wireless device. The network node 14 has processing circuitry 22. In some embodiments, the processing circuitry may include a memory 24 and processor 26, the memory 24 containing instructions which, when executed by the processor 26, configure processor 26 to perform the one or more functions described herein relating to configuring the wireless device. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

In some embodiments, the memory 24 is configured to store CSI reports 30, a number of beams, K, 32, power threshold parameters 34 and SINR values 36. The CSI reports 30 include channel state information received from a wireless device. In some embodiments, the processor 26 is configured to determine a number of beams via a beam number determiner 18 to be included in a multi-beam precoder codebook. The processor 26 is further configured to determine power threshold parameters via a power threshold parameter determiner 40. In some embodiments, the transceiver 28 is configured to transmit to the wireless device, a signal to interference plus noise ratio, SINR, to be used by the wireless device to determine to use one of a single beam precoder and a multiple beam precoder. The processor 26 is also configured to implement a CSI report size determiner 44 configured to determine a size of a CSI report received by the network node 14. In the alternative, or in addition, the processor 26 may implement a payload size determiner 45 configured to determine an uplink, UL, shared channel payload size based on the number of beams on the UL shared channel. The processor 26 is also configured to determine a configuration of the wireless device 16 to measure and report a received power for each of different reference signals via a configuration determiner 46.

In some embodiments, the processor 26 is further configured to determine a configuration of a wireless device to measure and report a received power for each CSI reference signal via a configuration determiner 42. The number of beams determined by beam number determiner 38 may be based on the power reports received from the wireless device.

A transceiver 28 is configured to transmit to the wireless device at least one power threshold parameter to be used by the wireless device to determine a number of beams to be included in a multi-beam precoder codebook and may be configured to transmit an SINR upon which a wireless decision may base a decision whether to use a single beam procoder or a multi-beam precoder. The transceiver 28 may be configured with an orthogonal beam transmitter 48 to transmit a plurality of orthogonal beams on different reference symbols. The transceiver 28 may also include a report receiver 50, configured to receive a power report for each of the different reference signals and configured to receive CSI reports 30.

Figure 13:
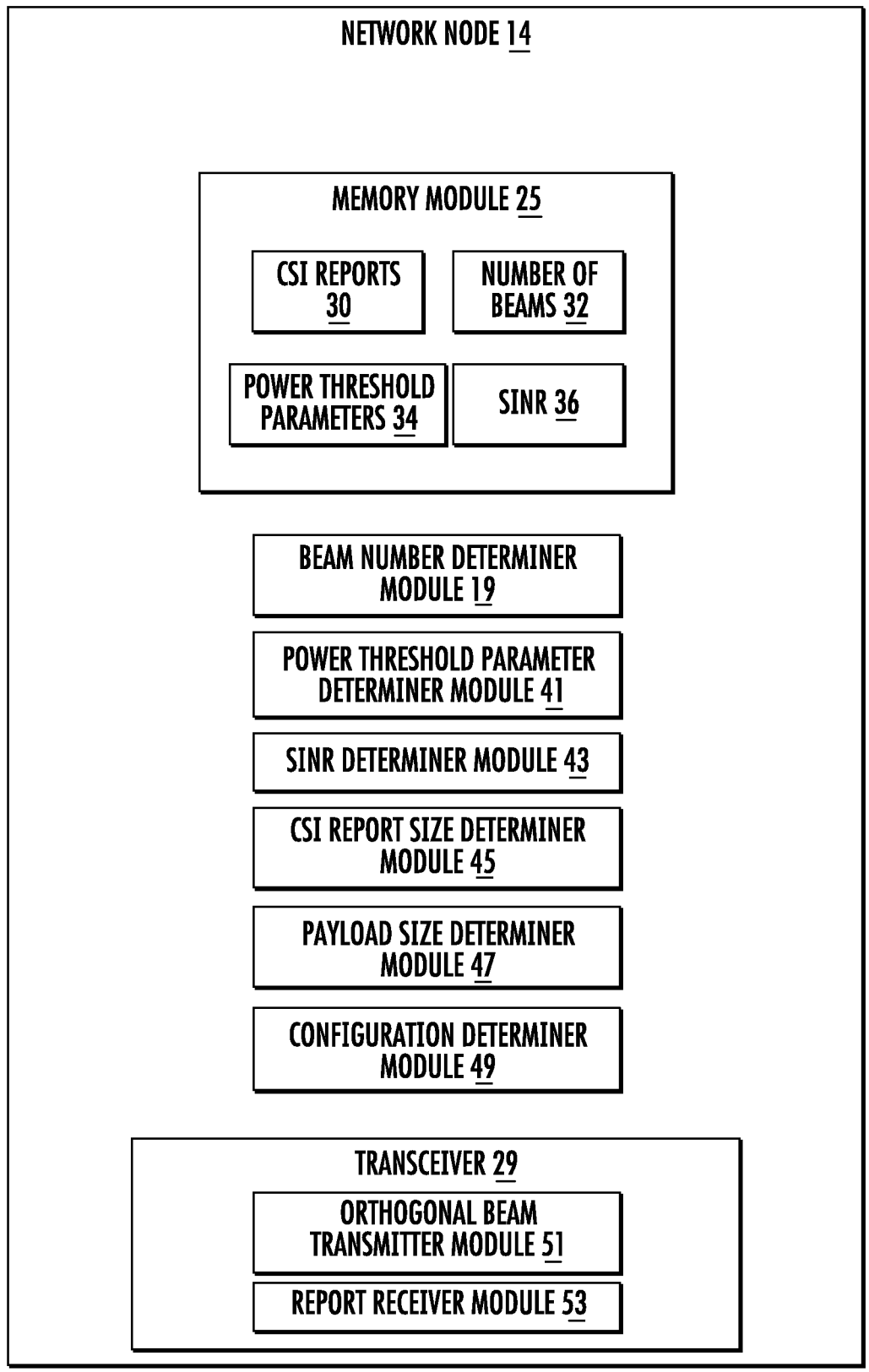
FIG. 13 is a block diagram of a wireless device.

FIG. 13 is a block diagram of an alternative embodiment of the network node 20 that includes a memory module 25, a beam number determiner module 19, a power threshold parameter determiner module 41, a configuration determiner module 43, an SINR determiner module 43, a CSI report size determiner module 45, a payload size determiner module 49, a configuration determiner module 49 and a transceiver module 29. The modules 19, 41, 43, 45, 47, 49 and at least a portion of the module 29 may be implemented as software modules executable by a computer processor. Thus, in some embodiments, the memory module 25 is configured to store CSI reports 30, a number of beams 32, power threshold parameters 34, and SINR values 36.

The beam number determiner module 19 is configured to determine a number of beams to be included in a multi-beam precoder codebook. The power threshold parameter determiner module 41 is further configured to determine power threshold parameters. In some embodiments, the SINR determiner module is configured determine a signal to interference plus noise ratio, SINR, to be used by the wireless device to determine to use one of a single beam precoder and a multiple beam precoder. The CSI report size determiner module 45 is configured to determine a size of the CSI report. A payload size determiner module 47 is configured to determine an uplink, UL, shared channel payload size based on the number of beams on the UL shared channel. The configuration determiner 49 is configured to determine a configuration of the wireless device 16 to measure and report a received power for each of different reference signals.

In some embodiments, the transceiver module 29 is configured to transmit to the wireless device a power threshold parameter to be used by the wireless device to determine a number of beams to be included in a multi-beam precoder codebook. The transceiver 29 may also be configured to transmit a signal to interference plus noise ratio, SINR, to be used by the wireless device to determine to use one of a single beam precoder and a multiple beam precoder. The transceiver module 29 may be configured with an orthogonal beam transmitter 51 to transmit a plurality of orthogonal beams on different reference symbols. The transceiver 29 may also include a report receiver module 53 configured to receive a power report for each of the different reference signals and configured to receive CSI reports 30.

Figure 14:
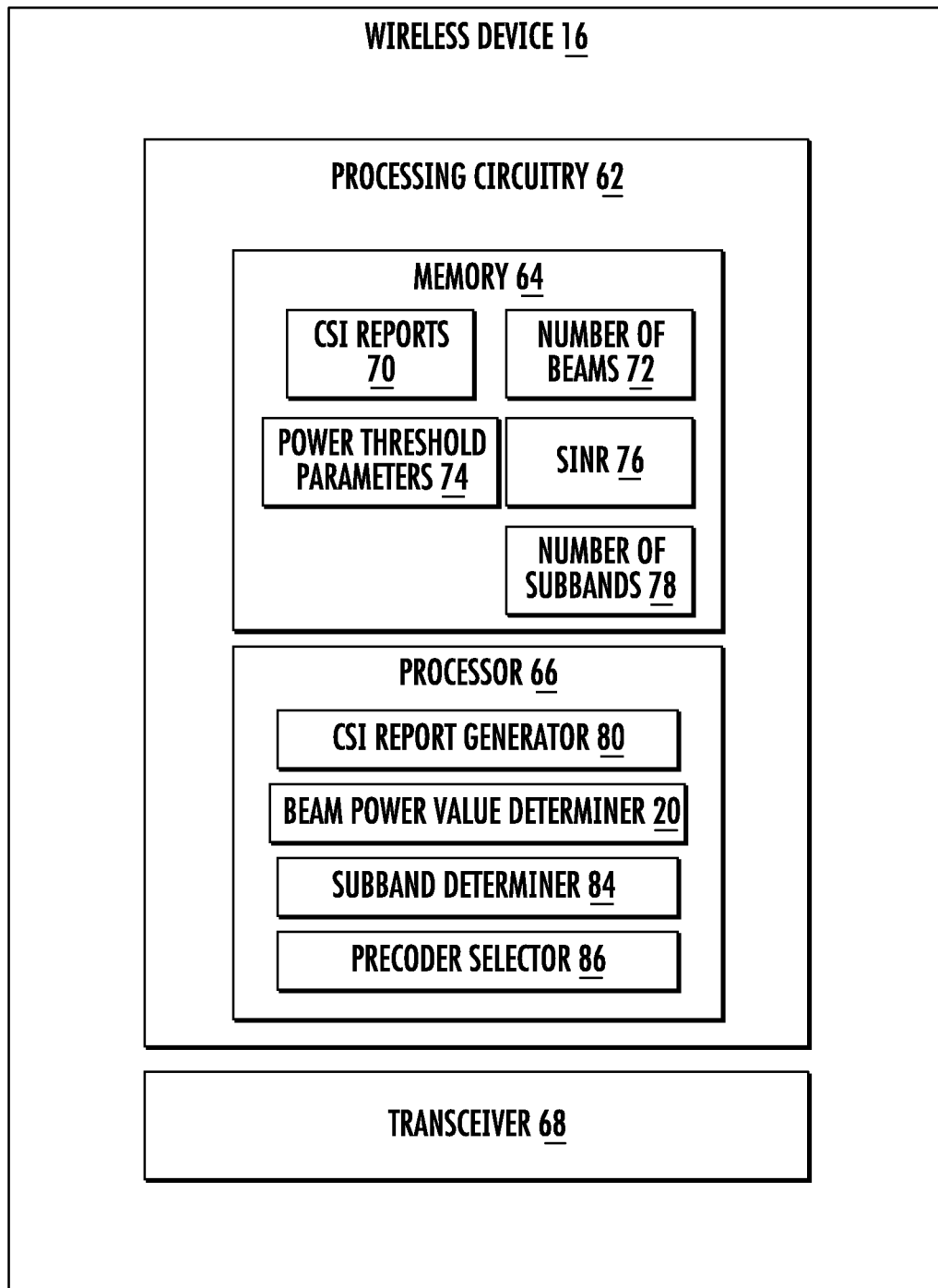
FIG. 14 is a block diagram of an alternative embodiment of a wireless device.

FIG. 14 is a block diagram of an embodiment of a wireless device 16 configured to determine multi-beam channel state information (CSI). The wireless device 16 may include processing circuitry 62 that may include a memory 64 and a processor 66 the memory 64 containing instructions which, when executed by the processor 66, configure processor 66 to perform the one or more functions described herein relating to configuring the wireless device. In addition to a traditional processor and memory, processing circuitry 62 may include integrated circuitry for processing and/or control, e.g., one or more processors and/or processor cores and/or FPGAs (Field Programmable Gate Array) and/or ASICs (Application Specific Integrated Circuitry).

Processing circuitry 62 may include and/or be connected to and/or be configured for accessing (e.g., writing to and/or reading from) memory 64, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 64 may be configured to store code executable by control circuitry and/or other data, e.g., data pertaining to communication, e.g., configuration and/or address data of nodes, etc. Processing circuitry 62 may be configured to control any of the methods described herein and/or to cause such methods to be performed, e.g., by processor 66. Corresponding instructions may be stored in the memory 64, which may be readable and/or readably connected to the processing circuitry 62. In other words, processing circuitry 62 may include a controller, which may comprise a microprocessor and/or microcontroller and/or FPGA (Field-Programmable Gate Array) device and/or ASIC (Application Specific Integrated Circuit) device. It may be considered that processing circuitry 62 includes or may be connected or connectable to memory, which may be configured to be accessible for reading and/or writing by the controller and/or processing circuitry 62.

In some embodiments, the memory 64 is configured to store CSI reports 70, a number of beams, K, 72, power threshold parameters 74, SINR values 76 and a number of subbands 78. The processor 66 implements a CSI report generator 80 that generates the CSI reports 48. The processor 66 also implements a beam power value determiner 20 that is configured to determine a number of beams to be included in a precoder codebook based on the received power threshold parameter 74. The processor 66 also implements a subband determiner 84 that is configured to determine a number of subbands to be fed back to a network node based on a system bandwidth and a number of beams to include in a multi-beam precoder codebook. The processor 66 also implements a precoder selector 86 that is configured to select whether to use one of a single beam precoder and a multiple beam precoder based on the received SINR 76. The transceiver 68 is configured to transmit the determined number of beams 72 and subbands 78 and to receive a power threshold parameter 74 and/or an SINR value 76.

Figure 15:
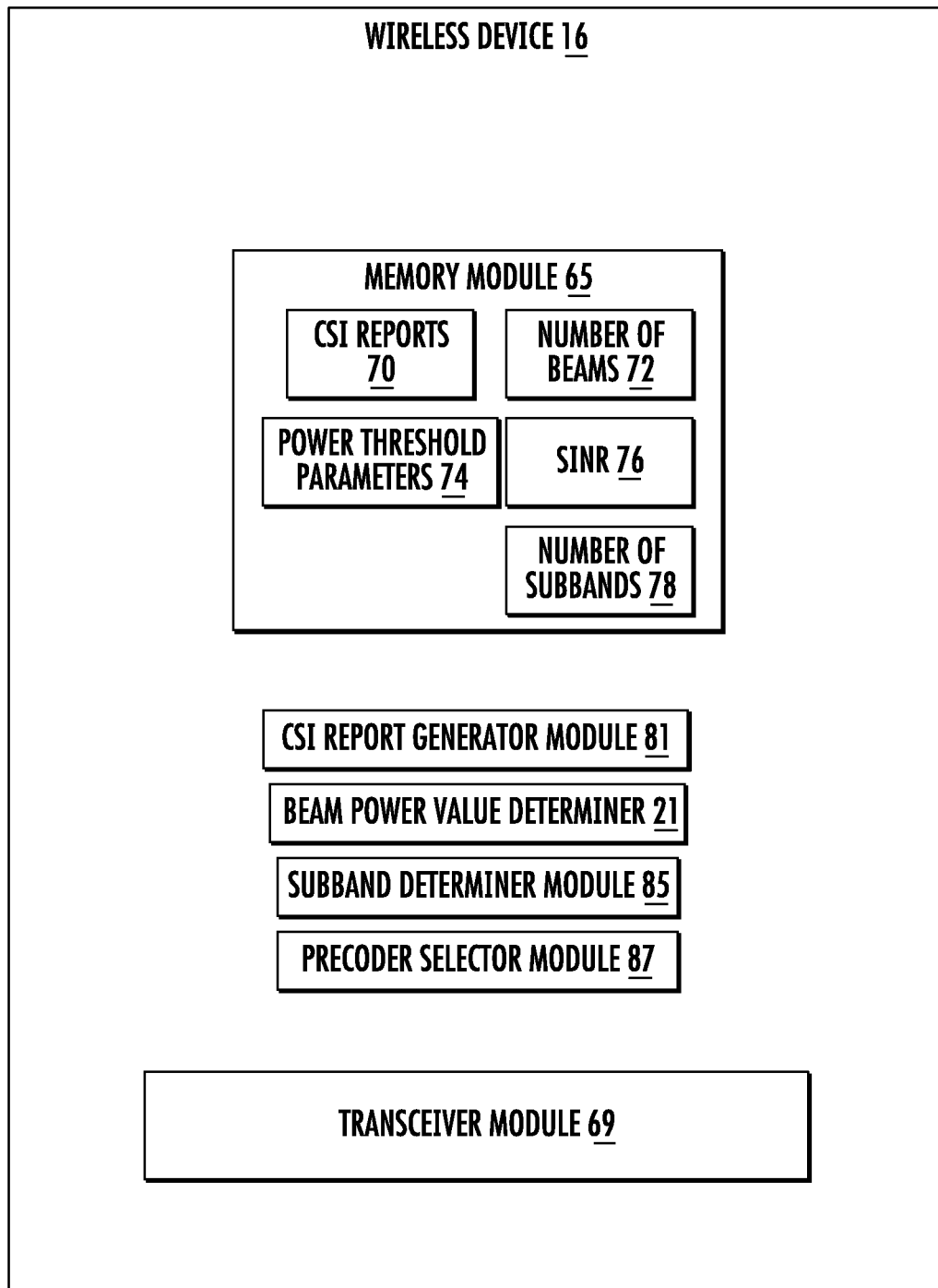
FIG. 15 is a flowchart of an exemplary process of configuring a wireless device.

FIG. 15 is a block diagram of an alternative embodiment of the wireless device 16 that includes memory module 65, a CSI report generator module 81, a beam power value determiner module 21, a subband number determiner module 85 and a precoder selector module 87. These modules may be implemented as software executable by a computer processor. The memory module 45, transceiver module 69, CSI report generator module 81, beam number determiner module 21, subband number determiner module 85 and precoder selector module 87 may perform the same functions as memory 44, transceiver 68, CSI report generator 80, beam power value determiner 20, subband number determiner 84 and precoder selector 86, respectively.

Figure 16:
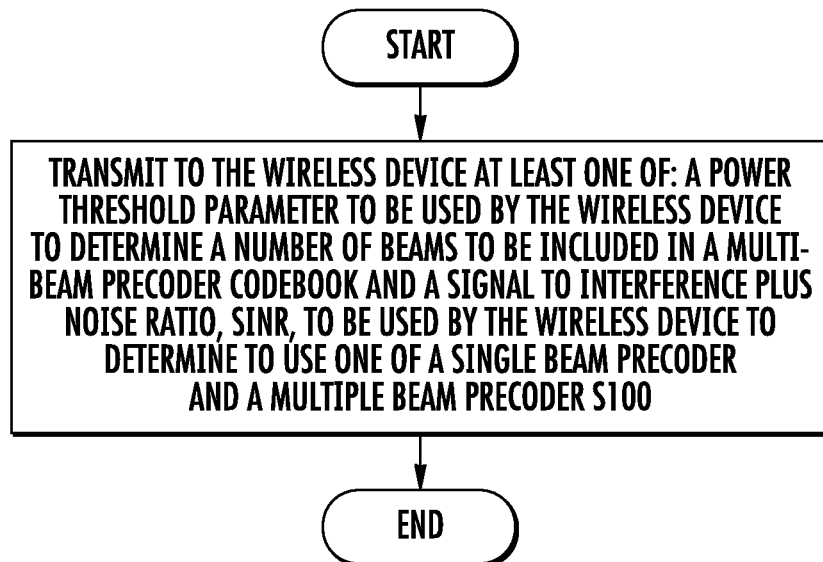
FIG. 16 is a flowchart of an exemplary process to determine a number of beams to include in a multi-beam precoder codebook by a wireless device.

FIG. 16 is a flowchart of an exemplary process of configuring a wireless device, including transmitting to the wireless device at least one of: a power threshold parameter to be used by the wireless device to determine a number of beams to be included in a multi-beam precoder codebook and a signal to interference plus noise ratio, SINR, to be used by the wireless device to determine to use one of a single beam precoder and a multiple beam precoder (block S100).

Figure 17:
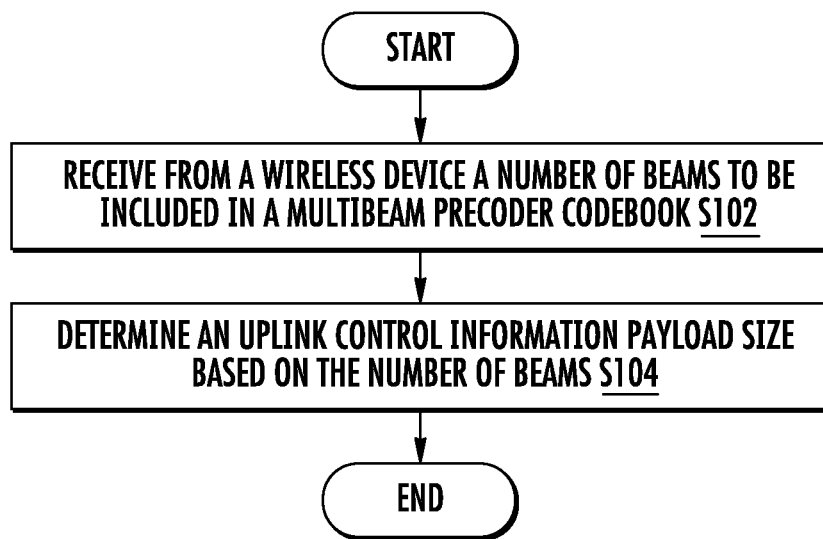
FIG. 17 is a flowchart of an exemplary process to determine at a network node a number of beams to be used by a wireless device when generating a multi-beam CSI report.

FIG. 17 is a flowchart of an exemplary process to determine a number of beams to include in a multi-beam precoder codebook by a wireless device. The process includes receiving via the transceiver 28 from the wireless device 16 the number of beams to be included in a multibeam precoder code book (block S102). The process also includes determining via the payload size determiner 44 an uplink control information payload size based on the number of beams (block S104).

Figure 18:
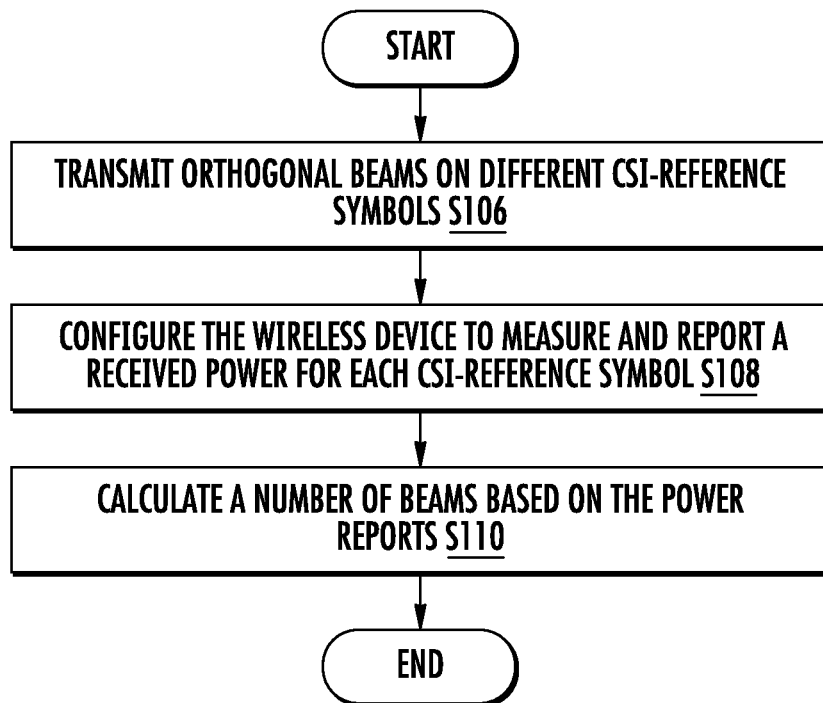
FIG. 18 is a flowchart of an exemplary process for beam number determination in a network node.

FIG. 18 is a flowchart of an exemplary process to determine at a network node a number of beams to be used by a wireless device when generating a multi-beam CSI report. The process includes transmitting via the transceiver 28 orthogonal beams on different reference signals (block S106). The process also includes configuring via the configuration determiner 47 the wireless device to measure and report a received power for each reference signal (block S108), and calculating via the beam number determiner 18, a number of beams to be used by the wireless device when generating the multi-beam CSI report based on the power reports (block S110).

Figure 19:
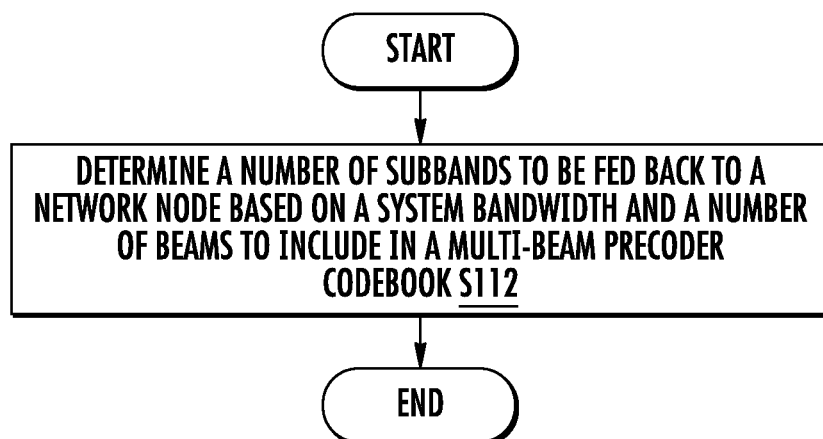
FIG. 19 is a flowchart of an exemplary process for determining a number of subbands to be fed back to a network node.

FIG. 19 is a flowchart of an exemplary process in a wireless device 16 configured to operate in a selective subband feedback mode. The process includes determining via the subband number determiner 84, a number of subbands to be fed back to a network node based on a system bandwidth and a number of beams to include in a multi-beam precoder codebook (block S112).

Figure 20:
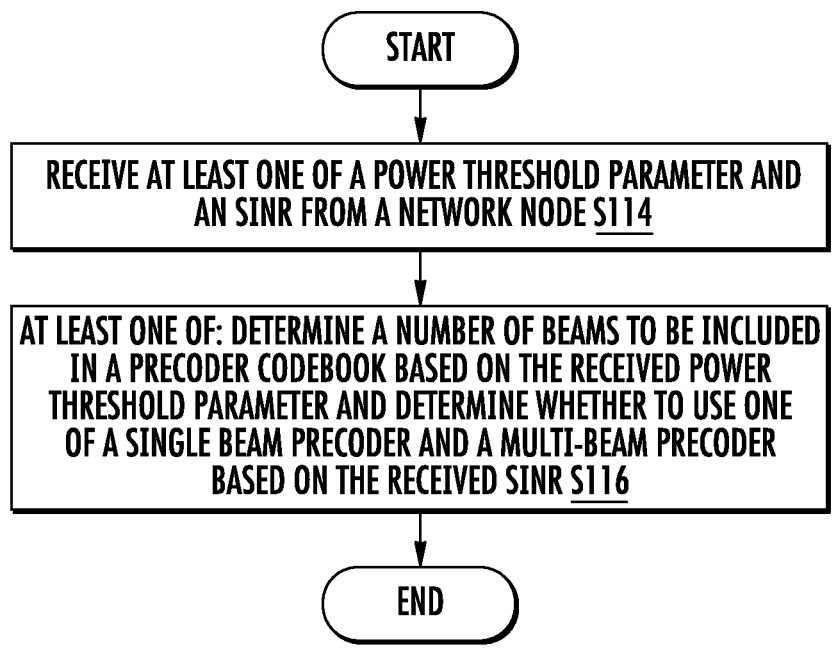
FIG. 20 is flowchart of an exemplary process for determining a number of beams to be included in a precoder codebook.

FIG. 20 is a flowchart of an exemplary process in a wireless device 16 for reducing uplink signaling overhead. The process includes receiving via the transceiver 68 at least one of a power threshold parameter and a signal to interference plus noise ratio, SINR, from a network node (block S114). The process also includes at least one of determining via the beam number determiner 20 a number of beams to be included in a precoder codebook based on the received power threshold parameter and determining via the precoder selector 86 whether to use one of a single beam precoder and a multiple beam precoder based on the received SINR (block S116).

Figure 21:
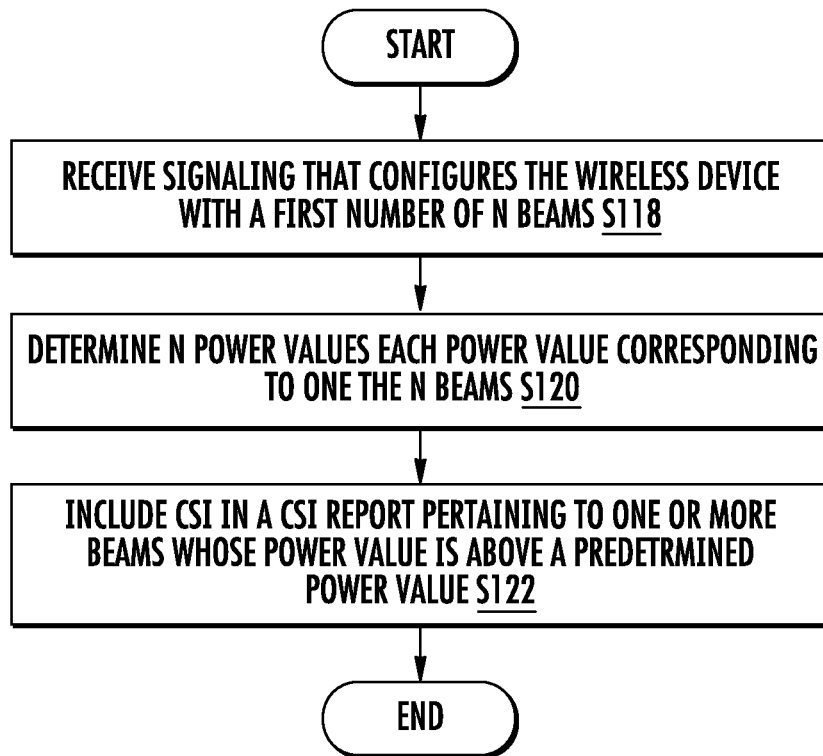
FIG. 21 is a flowchart of an exemplary process for generating a CSI report in a wireless device.

FIG. 21 is a flowchart of an exemplary process for a wireless device to adjust uplink signaling overhead. The process includes receiving signaling that configures the wireless device with a first number of beams, N, (block S118), the process also includes determining N power values, each power value corresponding to one of the N beams (block S120). The process also includes including channel state information, CSI, in a CSI report, the CSI pertaining to one or more beams whose corresponding power value is above a predetermined power value (block S122).

Figure 22:
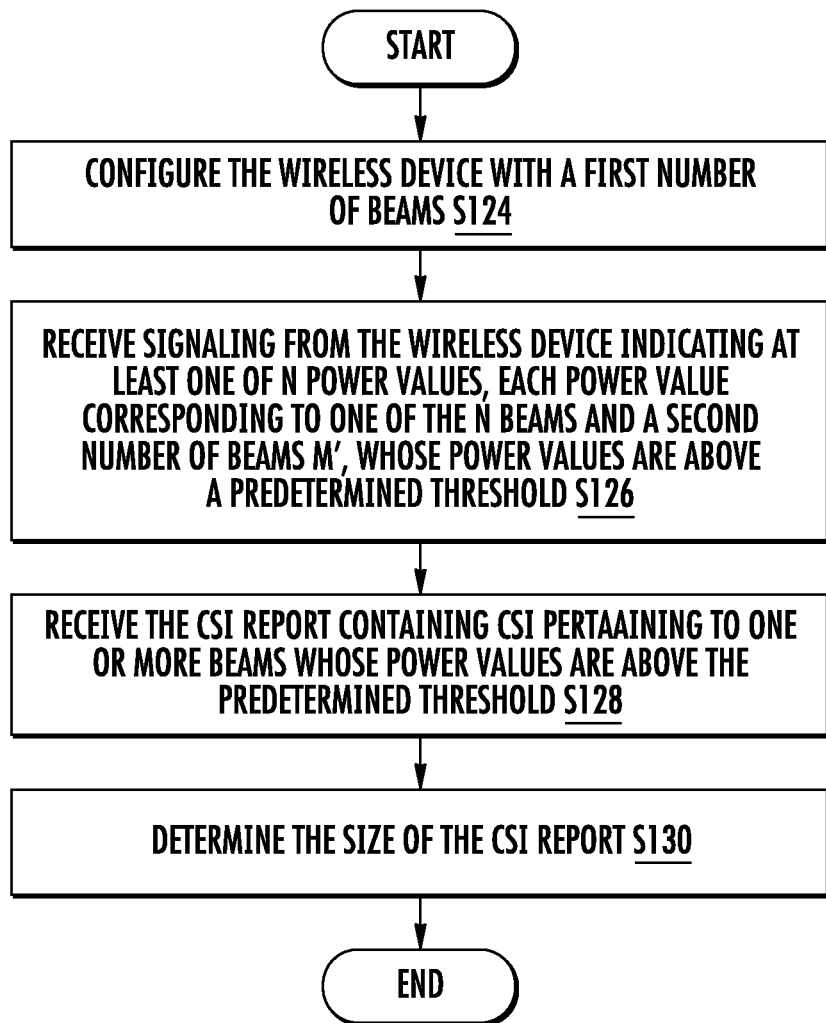
FIG. 22 is a flowchart of an exemplary process for determining a size of a CSI report.

FIG. 22 is a flowchart of an exemplary process for configuring a network node to determine a size of a channel state information (CSI) report. The process includes configuring a wireless device with a first number of beams, N (block S124). The process also includes receiving signaling from the wireless device indicating at least one of: N power values, each power value corresponding to one of N beams, and a second number of beams, M', whose corresponding power value is above a predetermined value (block S126). The process also includes receiving the CSI report from the wireless device, the CSI report containing CSI pertaining to one or more beams whose corresponding power value is above the predetermined power value (block S128). The process also includes determining the size of the CSI report (block S130).

Figure 23:
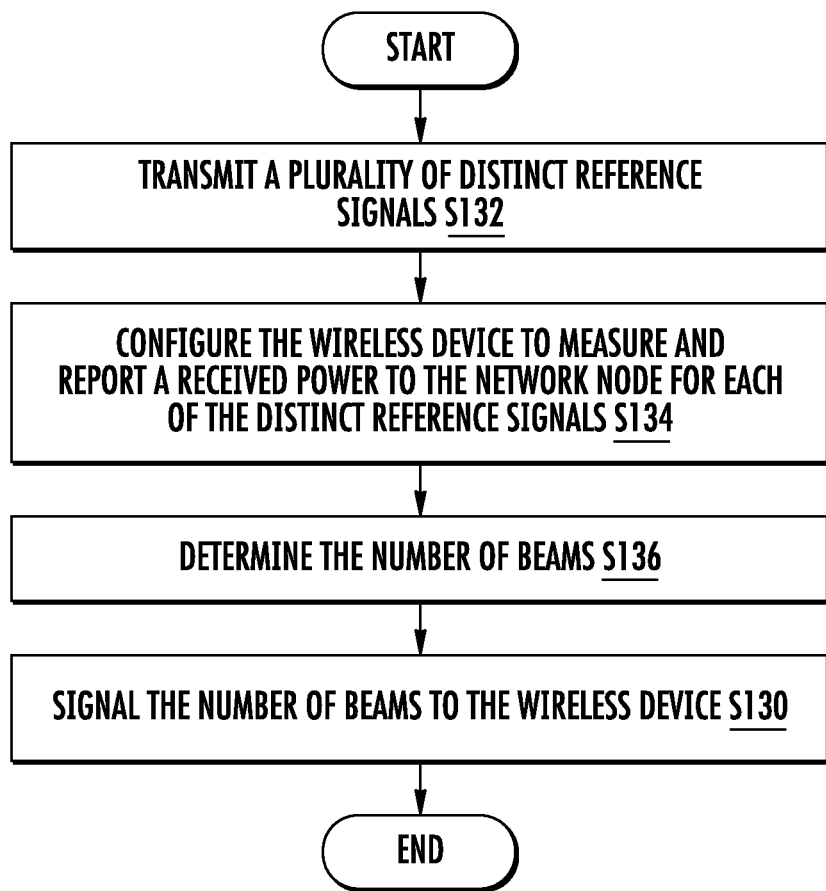
FIG. 23 is a flowchart of an exemplary process for determining a number of beams.

FIG. 23 is a flowchart of an exemplary process for determining at a network node a number of beams to be used by a wireless device when generating a multi-beam channel state information, CSI, report. The process includes transmitting a plurality of distinct reference signals (block S132). The process also includes configuring the wireless device to measure and report a received power to the network node for each of the distinct reference signals (block S134). The process further includes determining the number of beams (block S136). The process also includes signaling the number of beams to the wireless device (block S138).

Thus, some embodiments include a method for a wireless device 16 to adjust uplink signaling overhead. The method includes receiving signaling that configures the wireless device with a first number of beams, N S118. The method also includes determining N power values, each power value corresponding to one of the N beams S120. The method also includes including channel state information, CSI, in a CSI report, the CSI pertaining to one or more beams whose corresponding power value is above a predetermined power value S122.

In some embodiments, the method further includes determining whether the number of beams, N, is equal to one or greater than one using a signal to interference plus noise ratio, SINR. In some embodiments, the method further includes transmitting signaling by the wireless device 16 indicating at least one of: N power values, each power value corresponding to one of the N beams, and a second number of beams, M', whose corresponding power value is above a predetermined value. In some embodiments, the first number of beams is signaled via radio resource control, RRC. In some embodiments, the predetermined power value represents a power ratio with respect to a beam with a maximum received power. In some embodiments, a signal to interference plus noise ratio, SINR, is additionally used by the wireless device 16 to determine whether the number of beams is equal to one or greater than one. In some embodiments, each beam of the first number of beams (128) and a second number of beams is a kth beam, d(k), that has associated a set of complex numbers and has index pair ($l_k$, $m_k$), each element of the set of complex numbers being characterized by at least one complex phase shift such that:
  $d_n(k) = d_i(k)\alpha_{i,n} e^{j2\pi(p\Delta_{1,k} + q\Delta_{2,k})}$;
  $d_n(k)$, and $d_i(k)$ are the $i^{th}$ and $n^{th}$ elements of d(k), respectively;
  $\alpha_{i,n}$ is a real number corresponding to the $i^{th}$ and $n^{th}$ elements of d(k);
  p and q are integers;
  beam directions $\Delta_{1,k}$ and $\Delta_{2,k}$ are real numbers corresponding to beams with index pair ($l_k$, $m_k$) that determine the complex phase shifts $e^{j2\pi\Delta_{1,k}}$ and $e^{j2\pi\Delta_{2,k}}$ respectively; and
  each of the at least a co-phasing coefficient between the first and second beam (S130) is a complex number $c_k$ for d(k) that is used to adjust the phase of the $i^{th}$ element of d(k) according to $c_k d_i(k)$.

In some embodiments, a wireless device 16 for reducing uplink signaling overhead is provided. The wireless device 16 includes processing circuitry 62, which may include a memory 64 and a processor 66. The processing circuitry 62 is configured to store a number of beams, N, to be included in a multiple beam precoder codebook, the number of N beams being received from a network node 14 and further configured to perform at least one of: determine N power values, each power value corresponding to one of the N beams; and include CSI in the CSI report, the CSI pertaining to one or more beams whose corresponding power value is above a predetermined power valued.

In some embodiments, the processing circuitry 62 is further configured to determine whether the number of beams is equal to one or greater than one using an SINR. In some embodiments, the wireless device 16 includes a transceiver 68 configured to transmit signaling by the wireless device 16 indicating at least one of: N power values, each power value corresponding to one of the N beams; and a second number of beams, M', whose corresponding power value is above a predetermined value. In some embodiments, the first number of beams is signaled via radio resource control, RRC. In some embodiments, the predetermined power value represents a power ratio with respect to a beam with a maximum received power. In some embodiments, a signal to interference plus noise ratio, SINR, is additionally used by the wireless device 16 to determine whether the number of beams is equal to one or greater than one.

In some embodiments, a wireless device 16 for reducing uplink signaling overhead is provided. The wireless device 16 includes a memory module 65 configured to store a number of beams to be included in a multiple beam precoder codebook, the number of beams, N, being received from a network node 14. The wireless device 16 includes a beam power value determiner module 21 configured to determine N power values, each power value corresponding to one of the N beams. The wireless device 16 further includes a CSI report generator module 81 configured to include CSI in the CSI report, the CSI pertaining to one or more beams whose corresponding power value is above a predetermined power value.

In some embodiments, a method in a network node 14 for determining the size of a channel state information (CSI) report produced by a wireless device is provided. The method includes transmitting to the wireless device 16 configuration information with a first number of beams, N, S124. The method further includes receiving signaling from the wireless device 16 indicating at least one of: N power values, each power value corresponding to one of N beams, and a second number of beams, M', whose corresponding power value is above the predetermined threshold S126. The method further includes receiving the CSI report containing CSI pertaining to one or more beams whose corresponding power value is above the predetermined power value S128. The method further includes determining the size of the CSI report produced by the wireless device S130. In some embodiments, each beam of the first number of beams (128) and second number of beams is a kth beam, d(k), that has associated a set of complex numbers and has index pair ($l_k$, $m_k$), each element of the set of complex numbers being characterized by at least one complex phase shift such that:
  $d_n(k) = d_i(k)\alpha_{i,n} e^{j2\pi(p\Delta_{1,k} + q\Delta_{2,k})}$;
  $d_n(k)$, and $d_i(k)$ are the $i^{th}$ and $n^{th}$ elements of d(k), respectively;
  $\alpha_{i,n}$ is a real number corresponding to the $i^{th}$ and $n^{th}$ elements of d(k);
  p and q are integers;
  beam directions $\Delta_{1,k}$ and $\Delta_{2,k}$ are real numbers corresponding to beams with index pair ($l_k$, $m_k$) that determine the complex phase shifts $e^{j2\pi\Delta_{1,k}}$ and $e^{j2\pi\Delta_{2,k}}$ respectively; and
  each of the at least a co-phasing coefficient between the first and second beam (S130) is a complex number $c_k$ for d(k) that is used to adjust the phase of the $i^{th}$ element of d(k) according to $c_k d_i(k)$.

In some embodiments, the method further includes receiving the signaling in a first transmission including a medium access control, MAC, control element and receiving additional components of the CSI report in a second transmission on a physical uplink shared channel, PUSCH. In some embodiments, the method further includes receiving the signaling in a periodic report on a physical uplink control channel, PUCCH, and receiving additional components of the CSI report in a second transmission on a physical uplink shared channel, PUSCH. In some embodiments, the method further includes configuring the wireless device 16 with a higher layer parameter to specify in which subframes the signaling from the wireless device 16 is received. In some embodiments, the method further includes receiving the signaling in an aperiodic report on a physical uplink shared channel, PUSCH, and receiving additional components of the CSI report in a different report on the PUSCH. In some embodiments, the method further includes receiving the signaling on a physical uplink shared channel, PUSCH, that carries additional components of the CSI report. In some embodiments, the method further includes decoding the signaling followed by determining the size of the CSI report. In some embodiments, the first number of beams is signaled via radio resource control, RRC.

In some embodiments, a network node 14 configured to determine the size of a channel state information (CSI) report produced by a wireless device is provided. The network node 14 includes a memory 24 configured to store a predetermined power value. The network node 14 also includes a transceiver 28 configured to: transmit to the wireless device 16 configuration information with a first number of beams, N. The transceiver 28 is also configured to receive signaling from the wireless device 16 indicating at least one of: N power values, each power value corresponding to one of N beams; and a second number of beams, M', whose corresponding power value is above the predetermined value. The transceiver 28 is also configured to receive the CSI report containing CSI pertaining to one or more beams whose corresponding power value is above the predetermined power value. The network node 14 also includes a processor 26 configured to determine the size of the CSI report produced by the wireless device 16.

In some embodiments, the transceiver 28 is further configured to receive the signaling in a first transmission including a medium access control, MAC, control element and receiving additional components of the CSI report in a second transmission on a physical uplink shared channel, PUSCH. In some embodiments, the transceiver 28 is also configured to receive the signaling in a periodic report on a physical uplink control channel, PUCCH, and receiving additional components of the CSI report in a second transmission on a physical uplink shared channel, PUSCH. In some embodiments, the network node 14 is further configured to configure the wireless device 16 with a higher layer parameter to specify in which subframes the signaling from the wireless device 16 is received. In some embodiments, the transceiver 28 is further configured to receive the signaling in an aperiodic report on a physical uplink shared channel, PUSCH, and receiving additional components of the CSI report in a different report on the PUSCH. In some embodiments, the transceiver 28 is further configured to receive the signaling on a physical uplink shared channel, PUSCH, that carries additional components of the CSI report. In some embodiments, the processor 26 is further configured to decode the signaling followed by determining the size of the CSI report. In some embodiments, the first number of beams is signaled via radio resource control, RRC.

In some embodiments, a network node 14 configured to determine the size of a channel state information, CSI, report produced by a wireless device 16 is provided. The network node 14 includes a memory module 25 configured to store a predetermined power value. The network node 14 further includes a transceiver module 29 configured to transmit to the wireless device 16 configuration information with a first number of beams, N. The transceiver module 29 is further configured to receive signaling from the wireless device 16 indicating at least one of: N power values, each power value corresponding to one of N beams, and a second number of beams, M', whose corresponding power value is above the predetermined value. The transceiver module 29 is further configured to receive the CSI report containing CSI pertaining to one or more beams whose corresponding power value is above the predetermined power value. The network node 14 further includes a CSI report size determiner module 45 configured to determine the size of the CSI report produced by the wireless device 16.

In some embodiments, a method in a network node 12 of determining the size of a channel state information (CSI) report produced by a wireless device 16 is provided. The method includes configuring the wireless device 16 with a first number of beams, N, S124. The method further includes receiving signaling from the wireless device 16 indicating at least one of: N power values, each power value corresponding to one of N beams, and a second number of beams, M', whose corresponding power value is above threshold S126. The method further includes receiving the CSI report from the wireless device, the CSI report containing CSI pertaining to one or more beams whose corresponding power value is above the predetermined threshold S128. The method further includes determining the size of the CSI report S130.

In some embodiments, a network node 14 of determining the size of a channel state information (CSI) report produced by a wireless device 16 is provided. The network node 14 includes processing circuitry 22 which may include a memory 24 and a processor 26. In some embodiments, the memory 24 is configured to store a first number of beams, N, and a second number of beams, M'. A transceiver 28 is configured to receive at least one of: N power values, each power value corresponding to one of N beams, and a second number of beams, M', whose corresponding power value is above a predetermined value. The transceiver 28 is configured to receive the CSI report from the wireless device 16, the CSI report containing CSI pertaining to one or more beams whose corresponding power value is above the predetermined power value. The processor is configured to determine the size of the CSI report.

In some embodiments, a network node 14 configured to determine the size of a channel state information (CSI) report produced by a wireless device 16 is provided. The network node 14 includes a memory module 25 configured to store a first number of beams N and a second number of beams, M'. The network node 14 further includes a transceiver module 29 configured to receive at least one of: N power values, each power value corresponding to one of N beams, and a second number of beams, M', whose corresponding power value is above a predetermined value. The transceiver module 29 is also configured to receive the CSI report from the wireless device 16, the CSI report containing CSI pertaining to one or more beams whose corresponding power value is above the predetermined power value. The network node further includes a CSI report size determiner module 45 configured to determine the size of the CSI report.

In some embodiments, a method for determining at a network node 14 a number of beams to be used by a wireless device 16 when generating a multi-beam channel state information, CSI, report is provided. The method includes transmitting a plurality of distinct reference signals S132. The method also includes configuring the wireless device 16 to measure and report a received power to the network node for each of the distinct reference signals S134. The method further includes determining the number of beams S136, and signaling the number of beams to the wireless device 16 S138.

In some embodiments, a network node 14 configured to determine a number of beams to be used by a wireless device when generating a multi-beam channel state information, CSI, report is provided. The network node 14 includes processing circuitry 22 which may include a memory 24 and a processor 26. The memory 24 is configured to store CSI reports 30. The processor 26 is configured to cause transmission of a plurality of distinct reference signals. The processor 26 is also configured to configure the wireless device 16 to measure and report a received power to the network node 14 for each of the distinct reference signal. The processor 26 is also configured to determine the number of beams. A transceiver 28 is configured to signal the number of beams to the wireless device.

In some embodiments, a network node 14 configured to determine a number of beams to be used by a wireless device 16 when generating a multi-beam channel state information, CSI, report is provided. The network node 14 includes a memory module 25 configured to store CSI reports. The network node 16 includes a transmitter module 29 configured to transmit a plurality of distinct reference signals. A configuration determiner module 49 is configured to configure the wireless device 16 to measure and report a received power to the network node 14 for each of the distinct reference signals. A beam number determiner module 19 is configured to determine the number of beams. The transceiver module 29 is configured to signal the number of beams to the wireless device.

In some embodiments, a method in a wireless device 16 for reducing uplink feedback overhead for a wireless device 16 operating in a selective subband feedback mode is provided. The method includes determining a number of subbands to be fed back to a network node based on a system bandwidth and a number of beams to include in a multi-beam precoder codebook S112. In some embodiments a size of a subband is a function of the number of beams.

In some embodiments, a wireless device 16 for operating in a selective subband feedback mode is provided. The wireless device includes processing circuitry 62 which may include a memory 64 and a processor 66. The memory 64 is configured to store a number of subbands to be fed back to a network node 14. The processor 66 is configured to determine the number of subbands to be fed back based on a system bandwidth and a number of beams to be included in a multi-beam precoder codebook. In some embodiments, a size of a subband is a function of the number of beams.

In some embodiments, a wireless device 16 for operating in a selective subband feedback mode is provided. The wireless device includes a memory module 65 configured to store a number of subbands to be fed back to a network node. The method includes a subband determiner module 85 configured to determine the number of subbands to be fed back based on a system bandwidth and a number of beams to be included in a multi-beam precoder codebook.

Some embodiments include:

Embodiment 1

A method of configuring a wireless device, the method comprising: transmitting to the wireless device at least one of:
  a power threshold parameter to be used by the wireless device to determine a number of beams to be included in a multi-beam precoder codebook; and
  a signal to interference plus noise ratio, SINR, to be used by the wireless device to determine to use one of a single beam precoder and a multiple beam precoder.

Embodiment 2

The method of Embodiment 1, wherein the at least one power threshold parameter is signaled via radio resource control, RRC, and is associated with a non-zero power channel state information reference signal, CSI-RS, identifier.

Embodiment 3

The method of Embodiment 1, wherein different power threshold parameters are applicable to different transmission ranks.

Embodiment 4

The method of Embodiment 1, wherein a power threshold parameter represents a power ratio with respect to a beam with a maximum received power.

Embodiment 5

The method of Embodiment 1, wherein the wireless device is configured by the network node to include only beams having a power component exceeding a threshold in a multi-beam precoder code book.

Embodiment 6

A network node configured to configure a wireless device, the network node comprising:
  processing circuitry including a memory and a processor;
  the memory configured to store power threshold parameters;
  the processor configured to determine a number of beams to be included in a multi-beam precoder codebook; and
  a transceiver configured to transmit to the wireless device at least one of:
    power threshold parameter to be used by the wireless device to determine a number of beams to be included in a multi-beam precoder codebook; and
    a signal to interference plus noise ratio, SINR, to be used by the wireless device to determine to use one of a single beam precoder and a multiple beam precoder.

Embodiment 7

The network node of Embodiment 6, wherein the at least one power threshold parameter are signaled via radio resource control, RRC, and is associated with a non-zero power channel state information reference signal, CSI-RS, identifier.

Embodiment 8

The network node of Embodiment 6, wherein different power threshold parameters are applicable to different transmission ranks.

Embodiment 9

The network node of Embodiment 6, wherein a power threshold parameter represents a power ratio with respect to a beam with a maximum received power.

Embodiment 10

The network node of Embodiment 6, wherein the wireless device is configured by the network node to include only beams having a power component exceeding a threshold in a multi-beam precoder code book.

Embodiment 11

A method in a network node configured to determine a number of beams to include in a multi-beam precoder codebook by a wireless device, the method including:
receiving from the wireless device the number of beams to be included in a multi-beam precoder codebook; and
determining an uplink, UL, control information payload size on the UL shared channel based on the number of beams.

Embodiment 12

The method of Embodiment 11, wherein the network node is configured to receive the number of beams in a first transmission including a medium access control, MAC, control element and to received additional CSI components in a second transmission on a physical uplink shared channel, PUSCH.

Embodiment 13

The method of Embodiment 11, wherein the network node is configured to receive the number of beams in a periodic report on a physical uplink control channel and to receive additional CSI components in a second transmission on a physical uplink shared channel, PUSCH.

Embodiment 14

The method of Embodiment 11, wherein the network node is further configured to semi-statically configure the wireless device with a higher layer parameter to specify in which subframes the wireless device reports the number of beams.

Embodiment 15

The method of Embodiment 11, wherein the network node is configured to receive the number of beams in an aperiodic report on a physical uplink shared channel, PUSCH, and to receive additional CSI components in a different report on the PUSCH.

Embodiment 16

A network node configured to configure a wireless device, the network node comprising:
processing circuitry including a memory and a processor;
the memory configured to store a number of beams to be included in a multi-beam precoder codebook; and
the processor configured to determine an uplink, UL, shared channel payload size based on the number of beams on the UL shared channel; and
a transceiver configured to receive the number of beams.

Embodiment 17

The network node of Embodiment 16, wherein the network node is configured to receive the number of beams in a first transmission including a medium access control, MAC, element and to received additional CSI components in a second transmission on a physical uplink shared channel, PUSCH.

Embodiment 18

The network node of Embodiment 16, wherein the network node is configured to receive the number of beams in a periodic report on a physical uplink control channel and to receive additional CSI components in a second transmission on a physical uplink shared channel, PUSCH.

Embodiment 19

The network node of Embodiment 16, wherein the network node is further configured to semi-statically configure the wireless device with a higher layer parameter to specify in which subframes the wireless device reports the number of beams.

Embodiment 20

The network node of Embodiment 16, wherein the network node is configured to receive the number of beams in an aperiodic report on a physical uplink shared channel, PUSCH, and to receive additional CSI components in a different report on the PUSCH.

Embodiment 21

A method for determining at a network node a number of beams to be used by a wireless device when generating a multi-beam channel state information, CSI, report, the method comprising:
transmitting a plurality of orthogonal beams on different reference signals;
determine a configuration of the wireless device to measure and report a received power for each reference signal; and
calculating a number of beams to be used by the wireless device when generating the multi-beam CSI report based on the power reports.

Embodiment 22

The method of Embodiment 21, wherein the network node calculates the number of beams by using measurements on a sounding reference signal transmitted by the wireless device on the uplink.

Embodiment 23

A network node configured to determine a number of beams to be used by a wireless device when generating a multi-beam channel state information, CSI, report, the network node comprising:
processing circuitry including a memory and a processor;
the memory configured to store CSI reports;
the processor configured to:
determine a configuration of the wireless device to measure and report a received power for each CSI reference signal; and
calculate a number of beams to be used by the wireless device when generating the multi-beam CSI report based on the power reports.

Embodiment 24

The method of Embodiment 23, wherein the network node calculates the number of beams by using measurements on a sounding reference signal transmitted by the wireless device on the uplink.

Embodiment 25

A network node configured to determine a number of beams to be used by a wireless device when generating a multi-beam channel state information, CSI, report, the network node comprising:
  a memory module configured to store CSI reports;
  a configuration module configured to determine a configuration of the wireless device to measure and report a received power for each CSI reference signal;
  a beam number determiner module configured to calculate a number of beams to be used by the wireless devise when generating the multi-beam CSI report based on the power reports.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Abbreviations used in the preceding description include:
1D One dimensional
2D Two-Dimensional
3GPP Third Generation Partnership Project
5G Fifth Generation
ACK Acknowledgement
ASIC Application Specific Integrated Circuit
ARQ Automatic Retransmission Request
CA Carrier Aggregation
CB Codebook
CDMA Code Division Multiple Access
CFAI CSI Feedback Accuracy Indicator
CFI Control Information Indicator
CP Cyclic Prefix
CPU Central Processing Unit
CQI Channel Quality Indicators
CRS Common Reference Symbol/Signal
CSI Channel State Information
CSI-RS Channel State Information Reference Symbol/Signal
dB Decibel
DCI Downlink Control Information
DFT Discrete Fourier Transform
DL Downlink
eNB Enhanced or Evolved Node B
DP Dual Polarization
EPC Evolved Packet Core
EPDCCH Enhanced Physical Downlink Control Channel
EPRE Energy per Resource Element
E-UTRAN Evolved or Enhanced Universal Terrestrial Radio Access Network
FDD Frequency Division Duplexing
FD-MIMO Full Dimension MIMO
FFT Fast Fourier Transform
FPGA Field Programmable Gate Array
GSM Global System for Mobile Communications
HARQ Hybrid ARQ
ID Identifier
IFFT Inverse FFT
LSB Least Significant Bit
LTE Long Term Evolution
M2M Machine-to-Machine
MCS Modulation and Coding Scheme (or State)
MIMO Multiple Input Multiple Output
MME Mobility Management Entity
MSB Most Significant Bit
MU-MIMO Multi-User MIMO
NAK Non-Acknowledgement
NZP Non-Zero Power
OCC Orthogonal Cover Code
OFDM Orthogonal Frequency Division Multiplexing
PCFICH Physical Control Format Indicator Channel
PDA Personal Data Assistance
PDCCH Physical Downlink Control Channel
PDSCH Physical Downlink Shared Channel
PRB Physical Resource Block
PMI Precoder Matrix Indicator
PUCCH Physical Uplink Control Channel
PUSCH Physical Uplink Shared Channel
QPSK Quadrature Phase Shift Keying
RB Resource Block
RE Resource Element
Rel Release
RI Rank Indicator
RRC Radio Resource Control
SINR Signal to Interference plus Noise Ratio
SNR Signal to Noise Ratio
SP Single Polarization
SR Scheduling Request
SU-MIMO Single User MIMO
TDD Time Division Duplexing
TFRE Time/Frequency Resource Element
TP Transmission Point
TS Technical Specification
Tx Transmit
UCI Uplink Control Information
UE User Equipment
UL Uplink
ULA Uniform Linear Array
UMB Ultra Mobile Broadband
UPA Uniform Planar Array
WCDMA Wideband Code Division Multiple Access
ZP Zero Power.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a user equipment to adjust uplink signaling overhead, the method comprising:
   receiving signaling that configures the user equipment with a first number of beams, N, each beam is a kth beam, $d(k)$, that has associated a set of complex numbers and has index pair $(l_k, m_k)$, each element of the set of complex numbers being characterized by at least one complex phase shift such that:
   $d_n(k) = d_i(k)\alpha_{i,n} e^{j2\pi(p\Delta_{1,k} + q\Delta_{2,k})}$;
   $d_n(k)$, and $d_i(k)$ are the $i^{th}$ and $n^{th}$ elements of $d(k)$, respectively;
   $\alpha_{i,n}$ is a real number corresponding to the $i^{th}$ and $n^{th}$ elements of $d(k)$;
   p and q are integers;
   beam directions $\Delta_{1,k}$ and $\Delta_{2,k}$ are real numbers corresponding to beams with index pair $(l_k, m_k)$ that determine the complex phase shifts $e^{j2\pi\Delta_{1,k}}$ and $e^{j2\pi\Delta_{2,k}}$ respectively; and
   each of the at least a co-phasing coefficient between a first and second beam of the first number of beams is a complex number $c_k$ for $d(k)$ that is used to adjust the phase of the $i^{th}$ element of $d(k)$ according to $c_k d_i(k)$;
   determining N power values, each power value corresponding to one of the N beams;
   selecting one or more beams of the N beams to include in channel state information, CSI, based at least in part on the one or more beams having a corresponding power value above a predetermined power value; and
   including the CSI in a CSI report.

2. The method of claim 1, further comprising determining whether the number of beams, N, is equal to one or greater than one using a signal to interference plus noise ratio, SINR.

3. The method of claim 1, further comprising:
   transmitting signaling by the user equipment indicating at least one of:
   N power values, each power value corresponding to one of the N beams that were selected, and
   a second number of beams, M', whose corresponding power value is above a predetermined value.

4. The method of claim 1, wherein the first number of beams is signaled via radio resource control, RRC.

5. The method of claim 1, wherein the predetermined power value represents a power ratio with respect to a beam with a maximum received power.

6. The method of claim 1, wherein a signal to interference plus noise ratio, SINR, is additionally used by the user equipment to determine whether a second number of beams is equal to one or greater than one.

7. A user equipment configured to adjust uplink signaling overhead, the user equipment comprising:
   processing circuitry configured to:
   store a first number of beams, N, to be included in a multiple beam precoder codebook, the first number of beams, N, being received from a base station, each beam is a kth beam, $d(k)$, that has associated a set of complex numbers and has index pair $(l_k, m_k)$, each element of the set of complex numbers being characterized by at least one complex phase shift such that:
   $d_n(k) = d_i(k)\alpha_{i,n} e^{j2\pi(p\Delta_{1,k} + q\Delta_{2,k})}$;
   $d_n(k)$, and $d_i(k)$ are the $i^{th}$ and $n^{th}$ elements of $d(k)$, respectively;
   $\alpha_{i,n}$ is a real number corresponding to the $i^{th}$ and $n^{th}$ elements of $d(k)$;
   p and q are integers;
   beam directions $\Delta_{1,k}$ and $\Delta_{2,k}$ are real numbers corresponding to beams with index pair $(l_k, m_k)$ that determine the complex phase shifts $e^{j2\pi\Delta_{1,k}}$ and $e^{j2\pi\Delta_{2,k}}$ respectively; and
   each of the at least a co-phasing coefficient between the first and second beam (S130) is a complex number $c_k$ for d(k) that is used to adjust the phase of the $i^{th}$ element of d(k) according to $c_k d_i(k)$;

determine N power values, each power value corresponding to one of the N beams;

select one or more beams of the N beams to include in channel state information, CSI, based at least in part on the one or more beams having a corresponding power value above a predetermined power value; and include the CSI in a CSI report.

8. The user equipment of claim 7, wherein the processor is further configured to determine whether the first number of beams is equal to one or greater than one using an SINR.

9. The user equipment of claim 7, further comprising:

transmitting signaling by the user equipment indicating at least one of:

N power values, each power value corresponding to one of the N beams that were selected; and a second number of beams, M', whose corresponding power value is above a predetermined value.

10. The user equipment of claim 7, wherein the first number of beams is signaled via radio resource control, RRC.

11. The user equipment of claim 7, wherein the predetermined power value represents a power ratio with respect to a beam with a maximum received power.

12. The user equipment of claim 7, wherein a signal to interference plus noise ratio, SINR, is additionally used by the user equipment to determine whether a second number of beams, M', is equal to one or greater than one.

* * * * *